(12) United States Patent
Eda et al.

(10) Patent No.: US 9,969,629 B2
(45) Date of Patent: *May 15, 2018

(54) WATER TREATMENT PROCESS AND WATER TREATMENT SYSTEM

(71) Applicant: MITSUBISHI HEAVY INDUSTRIES, LTD., Tokyo (JP)

(72) Inventors: Masayuki Eda, Tokyo (JP); Susumu Okino, Tokyo (JP); Ryuji Yoshiyama, Tokyo (JP); Hideaki Sakurai, Tokyo (JP); Nobuyuki Ukai, Tokyo (JP); Hideo Suzuki, Tokyo (JP); Hiroshi Nakashoji, Tokyo (JP); Shigeru Yoshioka, Tokyo (JP)

(73) Assignee: MITSUBISHI HEAVY INDUSTRIES, INC., Tokyo (JP)

( * ) Notice: Subject to any disclaimer, the term of this patent is extended or adjusted under 35 U.S.C. 154(b) by 364 days.

This patent is subject to a terminal disclaimer.

(21) Appl. No.: 14/672,996

(22) Filed: Mar. 30, 2015

(65) Prior Publication Data
US 2015/0203381 A1    Jul. 23, 2015

Related U.S. Application Data

(63) Continuation of application No. PCT/JP2014/064518, filed on May 30, 2014.

(30) Foreign Application Priority Data
Jul. 5, 2013  (JP) .................................. 2013-141932

(51) Int. Cl.
C02F 5/02    (2006.01)
C02F 5/08    (2006.01)
(Continued)

(52) U.S. Cl.
CPC .............. C02F 1/52 (2013.01); B01D 9/0036 (2013.01); B01D 19/0005 (2013.01);
(Continued)

(58) Field of Classification Search
None
See application file for complete search history.

(56) References Cited

U.S. PATENT DOCUMENTS 4,036,749 A    7/1977   Anderson
5,120,447 A    6/1992   Christian
(Continued)

FOREIGN PATENT DOCUMENTS

AU    2010357340 B2    1/2012
CN       1236330 A    11/1999
(Continued)

OTHER PUBLICATIONS

Extended European Search Report (EESR) dated May 23, 2016, issued in EP Application No. 14 81 9637 (counterpart to U.S. Appl. No. 14/673,366). (10 pages).
(Continued)

*Primary Examiner* — Clare M Perrin
(74) *Attorney, Agent, or Firm* — Westerman, Hattori, Daniels & Adrian, LLP

(57) ABSTRACT

Provided are a water treatment system and a water treatment process, which are capable of reproducing water containing salts with high water recovery. A water treatment system 100 comprises a second demineralizing section 210*a*, 210*b* that separates water to be treated containing Ca ions, $SO_4$ ions and carbonate ions into concentrated water in which the Ca ions and the $SO_4$ ions are concentrated and treated water; a crystallizing section which is positioned on a downstream side of the second demineralizing section 210*a*, 210*b* and which includes a second crystallizing tank 221*a*, 221*b* that
(Continued)

crystallizes gypsum from the concentrated water and a seed crystal supplying section that supplies seed crystals of gypsum to the second crystallizing tank 221a, 221b; and a separating section that is positioned on a downstream side of the crystallizing section and separates the gypsum from the concentrated water.

28 Claims, 14 Drawing Sheets

(51) Int. Cl.
*C02F 5/10* (2006.01)
*C02F 1/52* (2006.01)
*B01D 21/01* (2006.01)
*B03D 3/00* (2006.01)
*B01D 61/00* (2006.01)
*C02F 9/00* (2006.01)
*B01D 9/00* (2006.01)
*B01D 61/02* (2006.01)
*B01D 61/04* (2006.01)
*B01D 65/08* (2006.01)
*B01D 19/00* (2006.01)
*C02F 1/00* (2006.01)
*C02F 1/44* (2006.01)
*C02F 1/68* (2006.01)
*B01D 15/00* (2006.01)
*B01D 21/00* (2006.01)
*B01J 20/00* (2006.01)
*B01D 21/24* (2006.01)
*B01D 37/00* (2006.01)
*B01D 61/42* (2006.01)
*C02F 1/20* (2006.01)
*C02F 1/42* (2006.01)
*C02F 1/469* (2006.01)
*C02F 1/66* (2006.01)
*C02F 101/10* (2006.01)
*C02F 1/04* (2006.01)
*C02F 103/02* (2006.01)

(52) U.S. Cl.
CPC ........... *B01D 61/025* (2013.01); *B01D 61/04* (2013.01); *B01D 65/08* (2013.01); *C02F 1/5281* (2013.01); *C02F 9/00* (2013.01); *B01D 61/42* (2013.01); *B01D 2311/04* (2013.01); *B01D 2311/12* (2013.01); *B01D 2311/18* (2013.01); *B01D 2311/2642* (2013.01); *B01D 2311/2649* (2013.01); *B01D 2311/2657* (2013.01); *C02F 1/04* (2013.01); *C02F 1/20* (2013.01); *C02F 1/42* (2013.01); *C02F 1/441* (2013.01); *C02F 1/442* (2013.01); *C02F 1/4691* (2013.01); *C02F 1/4693* (2013.01); *C02F 1/66* (2013.01); *C02F 5/10* (2013.01); *C02F 2001/007* (2013.01); *C02F 2001/5218* (2013.01); *C02F 2101/10* (2013.01); *C02F 2101/101* (2013.01); *C02F 2103/023* (2013.01); *C02F 2209/06* (2013.01)

(56) References Cited

U.S. PATENT DOCUMENTS

| | | | |
|---|---|---|---|
| 5,250,185 A | 10/1993 | Tao et al. | |
| 5,501,798 A | 3/1996 | Al-Samadi et al. | |
| 5,532,039 A | 7/1996 | Payne et al. | |
| 5,925,255 A * | 7/1999 | Mukhopadhyay | B01D 61/022 210/638 |
| 7,419,643 B1 | 9/2008 | Jones | |
| 7,815,804 B2 | 10/2010 | Nagghappan | |
| 2002/0153319 A1 | 10/2002 | Mukhopadhyay | |
| 2003/0127226 A1 | 7/2003 | Heins | |
| 2005/0150834 A1 | 7/2005 | Duke et al. | |
| 2005/0150838 A1 | 7/2005 | Duke et al. | |
| 2005/0150839 A1 | 7/2005 | Duke et al. | |
| 2005/0218080 A1 | 10/2005 | Duke et al. | |
| 2006/0151394 A1 | 7/2006 | Duke et al. | |
| 2006/0196836 A1 | 9/2006 | Arakel et al. | |
| 2006/0251556 A1 | 11/2006 | Jones | |
| 2008/0099154 A1 | 5/2008 | Minnich et al. | |
| 2008/0110630 A1 | 5/2008 | Minnich et al. | |
| 2008/0121585 A1 * | 5/2008 | Mavis | C02F 1/441 210/652 |
| 2008/0135478 A1 | 6/2008 | Zuback et al. | |
| 2008/0185294 A1 | 8/2008 | Cai et al. | |
| 2008/0290033 A1 * | 11/2008 | Kimball | B01D 61/022 210/652 |
| 2009/0101587 A1 | 4/2009 | Blokker et al. | |
| 2009/0159420 A1 | 6/2009 | Duke et al. | |
| 2010/0186961 A1 | 7/2010 | Notte et al. | |
| 2011/0023715 A1 | 2/2011 | Nagghappan | |
| 2011/0024354 A1 | 2/2011 | Xia et al. | |
| 2011/0132839 A1 | 6/2011 | Zuback et al. | |
| 2011/0155665 A1 | 6/2011 | Cohen et al. | |
| 2011/0163032 A1 | 7/2011 | Alexander et al. | |
| 2011/0198285 A1 | 8/2011 | Wallace | |
| 2011/0210069 A1 | 9/2011 | Xiang et al. | |
| 2011/0253628 A1 | 10/2011 | Blokker et al. | |
| 2011/0303606 A1 | 12/2011 | Takeuchi et al. | |
| 2011/0303607 A1 | 12/2011 | Vora et al. | |
| 2012/0160770 A1 | 6/2012 | Banerjee et al. | |
| 2012/0205313 A1 | 8/2012 | Sathrugnan et al. | |
| 2014/0311959 A1 | 10/2014 | Kamimura et al. | |
| 2015/0068982 A1 | 3/2015 | Yoshiyama et al. | |
| 2016/0115061 A1 | 4/2016 | Ukai et al. | |
| 2016/0185619 A1 | 6/2016 | Ukai et al. | |
| 2016/0207811 A1 | 7/2016 | Kamito et al. | |
| 2016/0289099 A1 | 10/2016 | Wallace | |

FOREIGN PATENT DOCUMENTS

| | | |
|---|---|---|
| CN | 1151862 C | 6/2004 |
| CN | 1778695 A | 5/2006 |
| CN | 101595064 A | 12/2009 |
| CN | 101712521 A | 5/2010 |
| CN | 102167463 A | 8/2011 |
| CN | 102216224 A | 10/2011 |
| CN | 102863055 A | 1/2013 |
| CN | 102933507 A | 2/2013 |
| CN | 103025403 A | 4/2013 |
| EP | 1 106 237 A1 | 6/2001 |
| EP | 1887011 A1 | 2/2008 |
| EP | 2397444 A1 | 12/2011 |
| EP | 3015160 A1 | 5/2016 |
| EP | 3018100 A1 | 5/2016 |
| JP | 59-16588 A | 1/1984 |
| JP | 62-294484 A | 12/1987 |
| JP | 4-271893 A | 9/1992 |
| JP | 7-60262 A | 3/1995 |
| JP | 10-85742 A | 4/1998 |
| JP | 10-113660 A | 5/1998 |
| JP | 10-128052 A | 5/1998 |
| JP | 10-137757 A | 5/1998 |
| JP | 11-188389 A | 7/1999 |
| JP | 2000-15257 A | 1/2000 |
| JP | 2000-511109 A | 8/2000 |
| JP | 2000-237748 A | 9/2000 |
| JP | 2000-317262 A | 11/2000 |
| JP | 2001-314873 A | 11/2001 |
| JP | 2002-11466 A | 1/2002 |
| JP | 2002-18437 A | 1/2002 |
| JP | 3332760 B2 | 10/2002 |
| JP | 2003-190707 A | 7/2003 |
| JP | 2004-016996 A | 1/2004 |
| JP | 2004-141799 A | 5/2004 |
| JP | 2010-274202 A | 12/2010 |
| JP | 4590383 B2 | 12/2010 |
| JP | 2011-147899 A | 8/2011 |

(56) References Cited

FOREIGN PATENT DOCUMENTS

| JP | 2011-200788 A | 10/2011 |
|---|---|---|
| JP | 2012-200657 A | 10/2012 |
| JP | 2013-520315 A | 6/2013 |
| TW | 201002630 A | 1/2010 |
| WO | 98/06483 A1 | 2/1998 |
| WO | 2004/035479 A1 | 4/2004 |
| WO | 2004/103918 A1 | 12/2004 |
| WO | 2010/018249 A1 | 2/2010 |
| WO | 2012/008013 A1 | 1/2012 |
| WO | 2013/009485 A1 | 1/2013 |
| WO | 2013/091129 A1 | 6/2013 |
| WO | 2013/099304 A1 | 7/2013 |
| WO | 2014/174647 A1 | 10/2014 |
| WO | 2015/001678 A1 | 1/2015 |
| WO | 2015/002309 A1 | 1/2015 |

OTHER PUBLICATIONS

Extended European (supplementary) Search Report dated Jun. 30, 2016, issued in Application No. 14820056.1 (counterpart to U.S. Appl. No. 14/673,114). (10 pages).
Extended European (supplementary) Search Report dated Jul. 7, 2016, issued in Application No. 14820212.0 (counterpart to U.S. Appl. No. 14/673,1483). (10 pages).
Extended European (supplementary) Search Report dated Jul. 7, 2016, issued in Application No. 14820653.5 (counterpart to U.S. Appl. No. 14/672,754). (11 pages).
Extended European (supplementary) Search Report dated Jul. 13, 2016, issued in counterpart Application No. 14819547.2 (12 pages).
Office Action dated Aug. 16, 2016, issued in Chinese Patent Application No. 201480036187.9 (counterpart to U.S. Appl. No. 14/673,114), with English translation. (31 pages).
Office Action dated Aug. 29, 2016, issued in counterpart Chinese Patent Application No. 201480038042.2, with English translation. (29 pages).
Office Action dated Aug. 30, 2016, issued in counterpart Chinese Patent Application No. 201480037826.3 (counterpart to U.S. Appl. No. 14/673,483), with English translation. (13 pages).
Office Action dated Sep. 13, 2016, issued in Japanese Patent Application No. 2015-525100 (counterpart to U.S. Appl. No. 14/672,996), with English translation. (12 pages).
Office Action dated Sep. 13, 2016, issued in Japanese Patent Application No. 2015-525101 (counterpart to U.S. Appl. No. 14/673,366), with English translation. (12 pages).
Office Action dated Apr. 12, 2017, issued in European Application No. 14 820 653.5 (counterpart to U.S. Appl. No. 14/672,754). (6 pages).

International Search Report dated Sep. 2, 2014, issued in corresponding application No. PCT/JP2014/064518.
International Search Report and the Written Opinion of the International Searching Authority dated Sep. 2, 2014, issued in application No. PCT/JP2014/064511.
International Search Report and the Written Opinion of the International Searching Authority dated Sep. 2, 2014, issued in application No. PCT/JP2014/064514.
International Search Report and the Written Opinion of the International Searching Authority dated Sep. 2, 2014, issued in application No. PCT/JP2014/064515.
International Search Report and the Written Opinion of the International Searching Authority dated Sep. 2, 2014, issued in application No. PCT/JP2014/064517.
International Search Report and the Written Opinion of the International Searching Authority dated Sep. 2, 2014, issued in application No. PCT/JP2014/064519.
Written Opinion of the International Searching Authority dated Sep. 2, 2014, issued in corresponding application No. PCT/JP2014/064518.
Karakatsanis et al., "Drinking Water from Mine Water Using the HiPRO® Process-Optimum Coal Mine Water Reclamation Plant", IMWA 2010; pp. 135-138.
Office Action dated Nov. 1, 2016, issued in Chinese Patent Application No. 201480038013.6 (counterpart to U.S. Appl. No. 14/672,807), with English translation. (33 pages).
Office Action dated Nov. 11, 2016, issued in Chinese Patent Application No. 201480038059.8 (counterpart to U.S. Appl. No. 14/672,754), with English translation. (12 pages).
Extended European Search Report dated Jul. 10, 2017, issued in European Application No. 17155802.6 (counterpart to U.S. Appl. No. 14/673,366). (8 pages).
Non-Final Office Action dated Jul. 10, 2017, issued in U.S. Appl. No. 14/672,754. (58 pages).
Non-Final Office Action dated Jul. 13, 2017, issued in U.S. Appl. No. 14/672,807. (46 pages).
Non-Final Office Action dated Jul. 19, 2017, issued in U.S. Appl. No. 14/673,366. (53 pages).
Non-Final Office Action dated Aug. 2, 2017, issued in U.S. Appl. No. 14/673,483. (45 pages).
Non-Final Office Action dated Jul. 11, 2017, issued in U.S. Appl. No. 14/673,114. (49 pages).
"Vitec ® 7000", Avista Technologies, accessed online Dec. 19, 2017, http://www.avistatech.com/antiscalants/vitec-7000, 4 pages.
Carbonate Chemistry of Seawater, accessed online Dec. 19, 2017, http://www.e-education.psu.edu/earth103/node/677, 3 pages.
Non-Final Office Action dated Dec. 22, 2017, issued in U.S. Appl. No. 14/673,366 (9 pages).

* cited by examiner

WATER TREATMENT PROCESS AND WATER TREATMENT SYSTEM

CROSS REFERENCE TO RELATED APPLICATIONS

This is a continuation of International Application PCT/JP2014/064518, with an international filing date of May 30, 2014, which is hereby incorporated by reference herein in its entirety. This application claims the benefit of Japanese Patent Application No. 2013-141932, the content of which is incorporated herein by reference.

TECHNICAL FIELD

The present invention relates to a water treatment process and a water treatment system for reproducing water to be treated containing Ca ions ($Ca^{2+}$), sulfate ions ($SO_4^{2-}$), and carbonate ions.

BACKGROUND ART

It is known that industrial waste water, saline water, and sewage contain large amounts of ions. In addition, in a cooling tower, heat is exchanged between a high-temperature exhaust gas discharged from the boiler, etc., and cooling water. As a result of this heat exchange, some of the cooling water turns into steam, and, accordingly, ions in the cooling water are concentrated. Therefore, the cooling water discharged from the cooling tower (blowdown water) has increased concentrations of ions.

Water containing a large amount of ions is subjected to a demineralization treatment and then discharged into the environment. As devices that perform the demineralization treatment, a reverse osmosis membrane device, a nanofiltration membrane device, an ion-exchange equipment, and the like are known.

Among ions contained in the water mentioned above, monovalent cations such as $Na^+$, $K^+$, and $NH_4^+$ and anions such as $Cl^-$ and $NO_3^-$ are highly soluble in water. On the other hand, divalent metal ions such as $Ca^{2+}$ and anions such as $SO_4^{2-}$ and $CO_3^{2-}$ are scale-forming components. Salts of scale-forming components have low solubility in water, and thus they tend to be deposited as scales. In particular, the saline water, industrial waste water, and blowdown water from a cooling tower mentioned above contain large amounts of $Ca^{2+}$, $SO_4^{2-}$, and carbonate ions ($CO_3^{2-}$, $HCO_3^-$). An example of the property is as follows: pH: 8, Na ions: 20 mg/L, K ions: 5 mg/L, Ca ions: 50 mg/L, Mg ions: 15 mg/L, $HCO_3$ ions: 200 mg/L, Cl ions: 200 mg/L, $SO_4$ ions: 120 mg/L, $PO_4$ ions: 5 mg/L. Among these, the concentrations of Ca ions, Mg ions, $SO_4$ ions, and $HCO_3$ ions are high, and as a result of their reaction, scales ($CaSO_4$, $CaCO_3$, etc.) are formed. When scales are produced in the device that performs a demineralization treatment, the treatment capacity is reduced. Therefore, it is required to perform a demineralization treatment without allowing for the production of scales.

Here, examples of plants using a water-cooling-type cooling tower are plants equipped with power generation facilities (power generation facilities include those for business purposes for electric power selling and those for industrial purposes for in-house electricity use, and the power generation is thermal power generation, geothermal power generation, etc.), plants equipped with power generation facilities and cooling facilities, etc. In addition, plants include ordinary chemical plants, steel plants, mining plants, oil field plants, gas field plants, mechanical plants, etc.

As a process for removing Ca ions, a lime soda process is known. According to the lime soda process, sodium carbonate is added to water to be treated, and Ca ions in the water to be treated are deposited/precipitated as calcium carbonate and thereby removed from the water.

Patent Literature 1 discloses a waste water treatment device including a combination of a chemical softening device, an ion-exchange equipment, a reverse osmosis membrane device, and the like using the lime soda process.

CITATION LIST

Patent Literature

{PTL 1} U.S. Pat. No. 7,815,804

SUMMARY OF INVENTION

Technical Problem

The lime soda process requires the addition of sodium carbonate for the treatment, and thus the treatment cost is high. In the lime soda process, when 1 mol of Ca ions are precipitated as calcium carbonate, 2 mol of $Na^+$ is produced. Meanwhile, in the case where $SO_4^{2-}$ is contained in water to be treated, it is not removed by the lime soda process. That is, in the lime soda process, water after the treatment contains an increased number of moles of ions.

Also in the case where Ca ions are removed using an ion-exchange equipment, the treatment of 1 mol of Ca ions results in the production of 2 mol of $Na^+$, and water the after treatment contains an increased number of moles of ions.

According to the system of Patent Literature 1, water that has been treated by the lime soda process and in an ion-exchange equipment is further treated in a reverse osmosis membrane device to remove ion components. Accordingly, the system of Patent Literature 1 has a problem in that because of the increased number of moles of ions, the osmotic pressure in the reverse osmosis membrane device is high, resulting in an increased treatment load. In addition, with the device of Patent Literature 1, $SO_4^{2-}$ is not removed but remains in the treated water, and it has been difficult to obtain high water recovery.

In addition, the waste water treatment device of Patent Literature 1 requires a large amount of chemicals for the reproduction of the ion-exchange equipment, and thus there has also been the problem of high treatment cost.

An object of the present invention is to provide a water treatment process and a water treatment system, which are capable of reproducing water containing salts with high water recovery.

Solution to Problem

A first aspect of the present invention is a water treatment process including: a demineralizing step of separating water to be treated containing Ca ions, $SO_4$ ions, and carbonate ions into concentrated water in which the Ca ions, the $SO_4$ ions, and the carbonate ions are concentrated and treated water; a crystallizing step of supplying seed crystals of gypsum to the concentrated water so that gypsum is crystallized from the concentrated water; and a separating step of separating the gypsum from the concentrated water after the crystallizing step.

A second aspect of the present invention is a water treatment system including: a demineralizing section that separates water to be treated containing Ca ions, $SO_4$ ions, and carbonate ions into concentrated water in which the Ca ions and the $SO_4$ ions are concentrated and treated water; a crystallizing section including a crystallizing tank that is installed on the downstream side of the demineralizing section and crystallizes gypsum from the concentrated water and a seed crystal supplying section that supplies seed crystals of gypsum to the crystallizing tank; and on the downstream side of the crystallizing section, a separating section that separates the gypsum from the concentrated water.

According to the first aspect and the second aspect, seed crystals of gypsum are added to the concentrated water in the crystallizing section and the crystallizing step, whereby gypsum can be crystallized and separated from the water to be treated. As a result, the water to be treated containing Ca ions and $SO_4$ ions can be treated with high water recovery, and the operation cost can be reduced. Further, this is also advantageous in that high-purity gypsum can be recovered.

A third aspect of the present invention is a water treatment process including: a first scale inhibitor supplying step of supplying a calcium scale inhibitor which is a scale inhibitor for inhibiting the deposition of a scale containing calcium to water to be treated containing Ca ions, $SO_4$ ions, carbonate ions, and silica; a first pH adjusting step of adjusting the water to be treated to a pH at which the silica is soluble in the water to be treated; a first demineralizing step of separating the water to be treated into first concentrated water in which the Ca ions, the $SO_4$ ions, the carbonate ions, and the silica are concentrated and treated water after the first scale inhibitor supplying step and the first pH adjusting step; a first crystallizing step of supplying seed crystals of gypsum to the first concentrated water so that gypsum is crystallized from the first concentrated water; and, a first separating step of separating the gypsum from the first concentrated water after the first crystallizing step.

A fourth aspect of the present invention is a water treatment system including: a first scale inhibitor supplying section that supplies a calcium scale inhibitor which is a scale inhibitor for inhibiting the deposition of a scale containing calcium to water to be treated containing Ca ions, $SO_4$ ions, carbonate ions and silica; a first pH adjusting section that supplies a pH adjuster to the water to be treated to adjust the pH of the water to be treated to such a value that the silica is soluble in the water to be treated; a first demineralizing section that is positioned on a downstream side of the first scale inhibitor supplying section and the first pH adjusting section and separates the water to be treated into first concentrated water in which the Ca ions, the $SO_4$ ions, the carbonate ions and the silica are concentrated and treated water; a first crystallizing section including a first crystallizing tank that is positioned on a downstream side of the first demineralizing section and crystallizes gypsum from the first concentrated water and a first seed crystal supplying section that supplies seed crystals of gypsum to the first crystallizing tank; and on a downstream side of the first crystallizing section, a first separating section that separates the gypsum from the first concentrated water.

According to the third aspect and the fourth aspect, a calcium scale inhibitor is added, and also the water to be treated is adjusted to a pH at which silica is soluble, followed by a water treatment. Accordingly, the production of scales in the first demineralizing section and the first demineralizing step can be inhibited. In addition, by adding seed crystals of gypsum to the first concentrated water in the first crystallizing section and the first crystallizing step, even when a scale inhibitor is present, gypsum can be crystallized and separated from the water to be treated. As a result, while inhibiting the production of scales, the water to be treated containing Ca ions, $SO_4$ ions, carbonate ions, and silica can be treated with high water recovery. In addition, the amount of chemicals required for the treatment and the power required for the operation can be reduced, and also maintenance is facilitated. Accordingly, the operation cost can be reduced. In addition, high-purity gypsum can be recovered in the course of water treatment.

A fifth aspect of the present invention is a water treatment process including: a second scale inhibitor supplying step of supplying a calcium scale inhibitor which is a scale inhibitor for inhibiting the deposition of a scale containing calcium and a silica scale inhibitor which is a scale inhibitor for inhibiting the deposition of silica to water to be treated containing Ca ions, $SO_4$ ions, carbonate ions, and silica; a second demineralizing step of separating the water to be treated into second concentrated water in which the Ca ions, the $SO_4$ ions, the carbonate ions, and the silica are concentrated and treated water after the second scale inhibitor supplying step; a second crystallizing step of supplying seed crystals of gypsum to the second concentrated water so that gypsum is crystallized from the second concentrated water; and a second separating step of separating the gypsum from the second concentrated water after the second crystallizing step.

A sixth aspect of the present invention is a water treatment system including: a second scale inhibitor supplying section that supplies a calcium scale inhibitor which is a scale inhibitor for inhibiting the deposition of a scale containing calcium and a silica scale inhibitor which is a scale inhibitor for inhibiting the deposition of silica to water to be treated containing Ca ions, $SO_4$ ions, carbonate ions and silica; a second demineralizing section that is positioned on a downstream side of the second scale inhibitor supplying section and separates the water to be treated into second concentrated water in which the Ca ions, the $SO_4$ ions and the silica are concentrated and treated water; a second crystallizing section including a second crystallizing tank that is positioned on a downstream side of the second demineralizing section and crystallizes gypsum from the second concentrated water and a second seed crystal supplying section that supplies seed crystals of gypsum to the second crystallizing tank; and on the downstream side of the second crystallizing section, a second separating section that separates the gypsum from the second concentrated water.

In the fifth aspect and the sixth aspect, owing to the effects of the calcium scale inhibitor and the silica scale inhibitor, the production of scales in the second demineralizing section and the second demineralizing step can be inhibited. In addition, by adding seed crystals of gypsum to the first concentrated water in the first crystallizing section and the first crystallizing step, even when a scale inhibitor is present, gypsum can be crystallized and separated from the water to be treated. As a result, the water to be treated containing Ca ions, $SO_4$ ions, and silica can be treated with high water recovery, and the operation cost can be reduced. Further, this is also advantageous in that high-purity gypsum can be recovered.

In the present invention, the water treatment processes of the third aspect and the fifth aspect and the water treatment systems of the fourth aspect and the sixth aspect can be combined in the flow direction of the water to be treated to perform a water treatment.

In the above aspect, it is preferable that the water treatment process includes a second separating step that separates the gypsum from the second concentrated water after the second crystallizing step.

In the above aspect, it is preferable that the water treatment system includes a second separating section that separates the gypsum from the second concentrated water on the downstream side of the second crystallizing section.

According to the above aspect, high-purity gypsum can be recovered in the course of water treatment.

In addition, in the above aspect, by separating and recovering the gypsum having a predetermined size, the water content of gypsum can be reduced. As a result, high-purity gypsum can be recovered.

In the above aspect, it is preferable that the gypsum separated in the first separating step is used as seed crystals of the gypsum. It is preferable that the gypsum separated in the second separating step is used as seed crystals of the gypsum.

In the above aspect, it is preferable that the gypsum separated in the first separating section is used as seed crystals of the gypsum. It is preferable that the gypsum separated in the second separating section is used as seed crystals of the gypsum.

According to the above aspect, seed crystals of gypsum are efficiently supplied, and thus the amount of seed crystals of gypsum to be used can be reduced.

In the above aspect, it is preferable that the first separating step is carried out a plurality of times in the flowing direction of the water to be treated per the first crystallizing step, the size of the gypsum to be separated in the first separating step carried out on the downstream side of the water to be treated is smaller than that in the first separating step carried out on the most upstream of the water to be treated, and the gypsum separated in the first separating step carried out on the downstream side of the water to be treated is supplied into the first concentrated water in the first crystallizing step. It is preferable that the second separating step is carried out a plurality of times in the flowing direction of the water to be treated per the second crystallizing step, the size of the gypsum to be separated in the second separating step carried out on the downstream side of the water to be treated is smaller than that in the second separating step carried out on the most upstream of the water to be treated, and the gypsum separated in the second separating step carried out on the downstream side of the water to be treated is supplied into the second concentrated water in the second crystallizing step.

In the above aspect, it is preferable that wherein the first separating section includes a plurality of classifiers in a flowing direction of the water to be treated per the first crystallizing section, wherein the size of the gypsum to be separated in the first classifier located on a downstream side of the water to be treated is smaller than in the first classifier located on a most upstream of the water to be treated, and the gypsum separated in the first classifier located on the downstream side of the water to be treated is supplied to the first concentrated water in the first crystallizing section.

It is preferable that the second separating section includes a plurality of second classifiers in the flowing direction of the water to be treated per the second crystallizing section, the size of the gypsum to be separated in the second classifier located on the downstream side of the water to be treated is smaller than in the second classifier located on the most upstream of the water to be treated, and the gypsum separated in the second classifier located on the downstream side of the water to be treated is supplied to the second concentrated water in the second crystallizing section.

According to the above aspect, gypsum having a relatively small size is further crystallized as seed crystals. Therefore, the recovery of high-purity gypsum can be improved, and the purity of gypsum can also be increased. In addition, the amount of gypsum flowing out to the downstream side is reduced, and thus the amount of precipitate recovered as waste in the precipitating section, for example, can be reduced.

In the above aspect, it is preferable that a third pH adjusting step of adjusting the second concentrated water to a pH at which calcium carbonate is soluble, wherein in the second crystallizing step, the gypsum separated in the first separating step is supplied into the second concentrated water after the adjustment of the pH in the third pH adjusting step.

In the above aspect, it is preferable that wherein the second pH adjusting section adjusts the second concentrated water to a pH at which calcium carbonate is soluble, and supplies the gypsum separated in the first separating section to the second crystallizing section.

According to the above aspect, high-purity gypsum can be recovered in the course of water treatment.

Advantageous Effects of Invention

According to the water treatment system and the water treatment process of the present invention, while inhibiting the production of scales such as calcium carbonate during the treatment, $Ca^{2+}$ and $SO_4^{2-}$ can be removed as gypsum from the water to be treated. Accordingly, the water recovery can be further improved.

Water treated by the present invention has a significantly reduced number of moles of ions on the downstream side. Therefore, the power of the demineralizing section located downstream can be significantly reduced.

Further, the present invention is also advantageous in that high-purity gypsum can be crystallized and recovered.

DESCRIPTION OF EMBODIMENTS

Water that is an object to be treated in the present invention (water to be treated) contains $Ca^{2+}$, $SO_4^{2-}$, carbonate ions, and silica. Specifically, the water to be treated (raw water) is saline water, sewage, industrial waste water, blowdown water from a cooling tower, or the like. The water to be treated may also contain metal ions, such as Mg ions.

First Reference Embodiment

Figure 1:
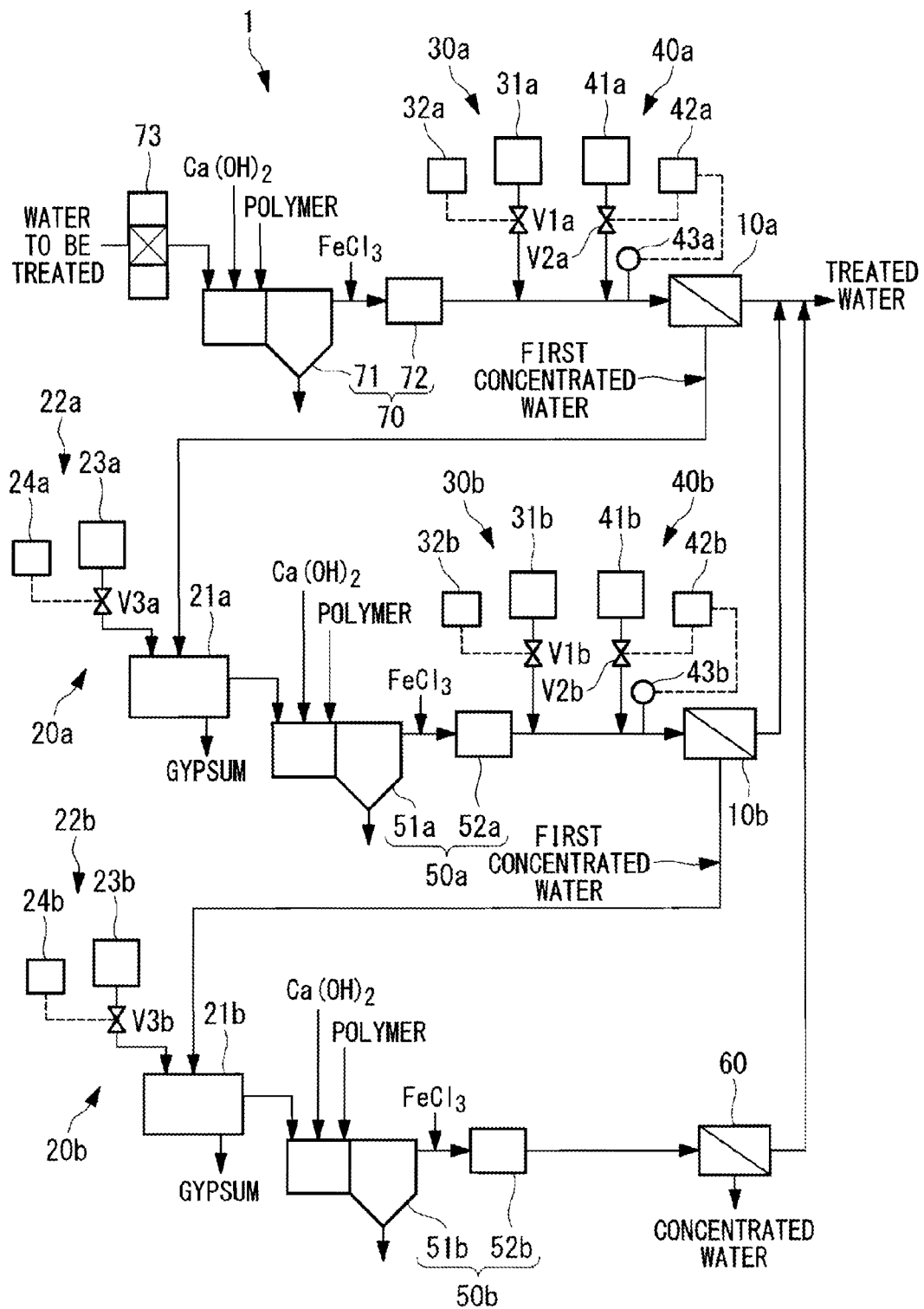
FIG. 1 is a schematic diagram of a water treatment system according to the first reference embodiment.

FIG. 1 is a schematic diagram of a water treatment system according to the first reference embodiment of the present invention. The water treatment system 1 of FIG. 1 is configured such that two water treatment sections are connected in the flow direction of the water to be treated. In the water treatment system 1 of this reference embodiment, depending on the properties of the water to be treated, the number of water treatment sections may be one, and it is also possible that three or more water treatment sections are connected.

Each water treatment section includes, from the upstream side of the water to be treated, a first demineralizing section 10 (10a, 10b) and a first crystallizing section 20 (20a, 20b). The concentration sides of the first demineralizing sections 10a and 10b are connected to the first crystallizing sections 20a and 20b, respectively. The water treatment section includes a first scale inhibitor supplying section 30 (30a, 30b) and a first pH adjusting section 40 (40a, 40b) in the flow path on the upstream side of each first demineralizing section 10 (10a, 10b).

The first scale inhibitor supplying section 30 (30a, 30b) is made up of a tank 31 (31a, 31b), a valve V1 (V1a, V1b), and a control section 32 (32a, 32b). The control sections 32a and 32b are connected to the valves V1a and V1b, respectively. The tanks 31a and 31b have stored therein a scale inhibitor.

The scale inhibitor used in this reference embodiment serves to inhibit the deposition of scales containing calcium in the water to be treated. It will be hereinafter referred to as "calcium scale inhibitor".

The calcium scale inhibitor suppresses the crystal nucleation of gypsum or calcium carbonate in the water to be treated. At the same time, the calcium scale inhibitor adheres to the surface of crystal nucleus of gypsum or calcium carbonate contained in the water to be treated (seed crystals, small-diameter scales deposited due to the exceeding of the saturation concentration, etc.), and functions to suppress the crystal growth of gypsum or calcium carbonate. Alternatively, there is another type of calcium scale inhibitor, which has the function of dispersing particles in the water to be treated (inhibiting aggregation), such as deposited crystals.

Examples of calcium scale inhibitors include phosphonic-acid-based scale inhibitors, polycarboxylic-acid-based scale inhibitors, and mixtures thereof. A specific example is FLOCON260 (trade name, manufactured by BWA).

In the case where Mg ions are contained in the water to be treated, a scale inhibitor that inhibits the deposition of scales containing magnesium (e.g., magnesium hydroxide) in the water to be treated can be used. It will be hereinafter referred to as "magnesium scale inhibitor".

Examples of magnesium scale inhibitors include polycarboxylic-acid-based scale inhibitors, etc. A specific example is FLOCON 295N (trade name, manufactured by BWA).

In the case where silica is contained in the water to be treated, a scale inhibitor that inhibits the deposition of silica as scales in the water to be treated can be used. It will be hereinafter referred to as a "silica scale inhibitor".

Examples of silica scale inhibitors include phosphonic-acid-based scale inhibitors, polycarboxylic-acid-based scale inhibitors, and mixtures thereof. A specific example is FLOCON260 (trade name, manufactured by BWA).

Although FIG. 1 shows only one first scale inhibitor supplying section 30a/30b in each position, in the case where two or more kinds of scale inhibitors are loaded, it is preferable that two or more first scale inhibitor supplying sections are installed. In this case, the scale inhibitors are sorted according to kind and stored in the respective tanks.

The first pH adjusting section 40 (40a, 40b) is made up of a tank 41 (41a, 41b), a valve V2 (V2a, V2b), a control section 42 (42a, 42b), and a pH meter 43 (43a, 43b). The tanks 41a and 41b have stored therein an alkali as a pH adjuster. The alkali is calcium hydroxide or sodium hydroxide, for example. Calcium hydroxide is particularly preferable because Ca ions are recovered as gypsum in the below-mentioned crystallizing step, and thus the amount of ions that reach the demineralizing section on the downstream side is reduced. The control sections 42a and 42b are connected to the valves V2a and V2b and the pH meters 43a and 43b, respectively.

In FIG. 1, the first demineralizing sections 10a and 10b are reverse osmosis membrane devices. In addition, the first demineralizing sections 10a and 10b may also be electrodialyzers (ED), electro dialysis reversal devices (EDR), electro de-ionization devices (EDI), ion-exchange equipments (IEx), capacitive de-ionization devices (CDI), nanofilters (NF), evaporators, etc.

Here, in a nanofilter (NF), an electrodialyzer (ED), an electro dialysis reversal device (EDR), an electro de-ionization device (EDI), and a capacitive de-ionization device (CDI), scale components (divalent ions, $Ca^{2+}$, $Mg^{2+}$, etc.) are selectively removed, while monovalent ions such as $Na^+$ and $Cl^-$ permeate. The use of these demineralizers suppresses an increase in the ion concentration of ions that serve as scale components in concentrated water. Accordingly, the water recovery can be improved, and also energy saving (e.g., the reduction of pump power, etc.) can be achieved.

In addition, in the case where the water to be treated is blowdown water from a cooling tower, the reclaimed water does not have to be pure water, and what is necessary is that scale components (divalent ions, $Ca^{2+}$, $Mg^{2+}$, etc.) are removed. Accordingly, it is advantageous to use a nanofilter (NF), etc.

Although only one first demineralizing section 10a/10b is shown in FIG. 1, the system may also be configured such that two or more demineralizers are connected in parallel or in series in the flow direction of the water to be treated.

The first crystallizing section 20 (20a, 20b) is made up of a first crystallizing tank 21 (21a, 21b) and a first seed crystal supplying section 22 (22a, 22b). The first seed crystal supplying sections 22a and 22b are connected to the first crystallizing tanks 21a and 21b, respectively. The first seed crystal supplying sections 22a and 22b have a seed crystal tank 23 (23a, 23b), a valve V3 (V3a, V3b), and a control section 24 (24a, 24b). The control sections 24a and 24b are connected to the valves V3a and V3b, respectively. The seed crystal tanks 23a and 23b store gypsum particles as seed crystals.

In the water treatment system 1 of FIG. 1, a first precipitating section 50 (50a, 50b) may be installed on the downstream side of each of the first crystallizing sections 20a and 20b. The first precipitating sections 50a and 50b each include a first precipitating tank 51 (51a, 51b) and a first filtration device 52 (52a, 52b).

The water treatment system 1 includes a downstream side demineralizing section 60 on the downstream side of the water to be treated of the first crystallizing section 20b located on the most downstream.

In FIG. 1, the downstream side demineralizing section 60 is a reverse osmosis membrane device. The downstream side demineralizing section 60 may also be an electrodialyzer (ED), an electro dialysis reversal device (EDR), an electro de-ionization device (EDI), an ion-exchange equipment, a capacitive de-ionization device (CDI), a nanofilter (NF), an evaporator, etc.

In the water treatment system 1, a precipitating tank 71 and a filtration device 72 are installed as a first upstream side precipitating section 70 on the upstream side of the first scale inhibitor supplying section 30a and the first pH adjusting section 40a which are located on the most upstream of the water to be treated. The precipitating tank 71 and the filtration device 72 have the same configuration as the first precipitating tank 51 and the first filtration device 52 of the first precipitating section 50.

In particular, in the case where Mg ions are contained in the water to be treated, the first upstream side precipitating section can be configured such that two or more precipitating tanks 71 are connected in series in the flow direction of the water to be treated.

In the water treatment system 1 shown in FIG. 1, a first deaerating section 73 may be provided on the upstream side of the first upstream side precipitating section 70. Specifically, the first deaerating section 73 is a deaeration tower equipped with a filler for removing carbon dioxide or is a separation membrane. On the upstream side of the water to be treated of the first deaerating section 73, a pH adjusting section (not shown) that adjusts the water to be treated to a pH at which carbonate ions are present in the form of $CO_2$ may be installed.

The first deaerating section 73 may also be installed on the downstream side of the water to be treated of the first upstream side precipitating section 70 and on the upstream side of the first scale inhibitor supplying section 30a and the first pH adjusting section 40a.

It is also possible that a deaerating section having the same configuration as the first deaerating section 73 is installed in the flow path between the first demineralizing section 10 and the first crystallizing section 20, in the flow path between the first crystallizing section 20 and the first precipitating section 50, and on the downstream side of the first precipitating section 50 and in the flow path between it and the first demineralizing section 10b or the downstream side demineralizing section 60.

In the case where the concentration of Ca ions in the water to be treated is high, an ion-exchange equipment (not shown) may be installed on the downstream of the filtration device 72 and on the upstream of the first scale inhibitor supplying section 30a and the first pH adjusting section 40a which are located on the most upstream. The ion-exchange equipment may be an ion-exchange resin column or an ion-exchange membrane device, for example.

When gypsum in the water to be treated flowing into the first demineralizing section 10a is already supersaturated, because ions are further concentrated in the first demineralizing section 10a, the resulting gypsum concentration is even higher. In this case, the loading of a large amount of calcium scale inhibitor is required. Further, the concentration of gypsum may become too high for the calcium scale inhibitor to exert its effect, resulting in the production of scales in the first demineralizing section 10a.

Thus, in the case where gypsum in the raw water (water to be treated) is supersaturated, it is possible that an upstream side crystallizing section (not shown) having the same configuration as the first crystallizing tanks 21a and 21b are provided on the upstream of the first scale inhibitor supplying section 30a and the first pH adjusting section 40a on the most upstream, so that the concentration of gypsum is reduced, and then the water to be treated is fed to the first demineralizing section 10a.

A process for treating water to be treated using the water treatment system 1 of the first reference embodiment will be described hereinafter.

Figure 2:
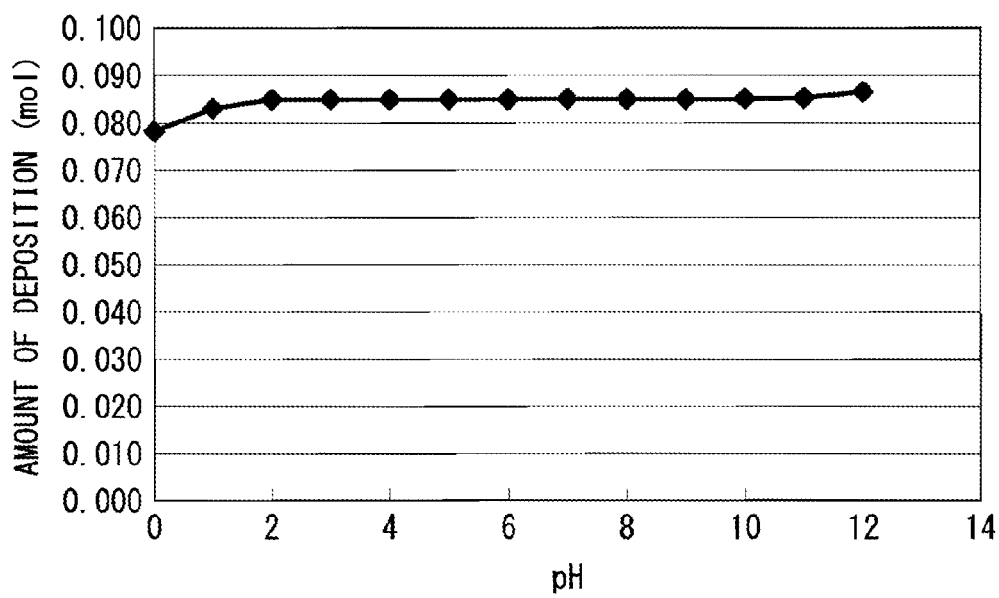
FIG. 2 shows simulation results for the pH dependency of the amount of gypsum deposited.
Figure 3:
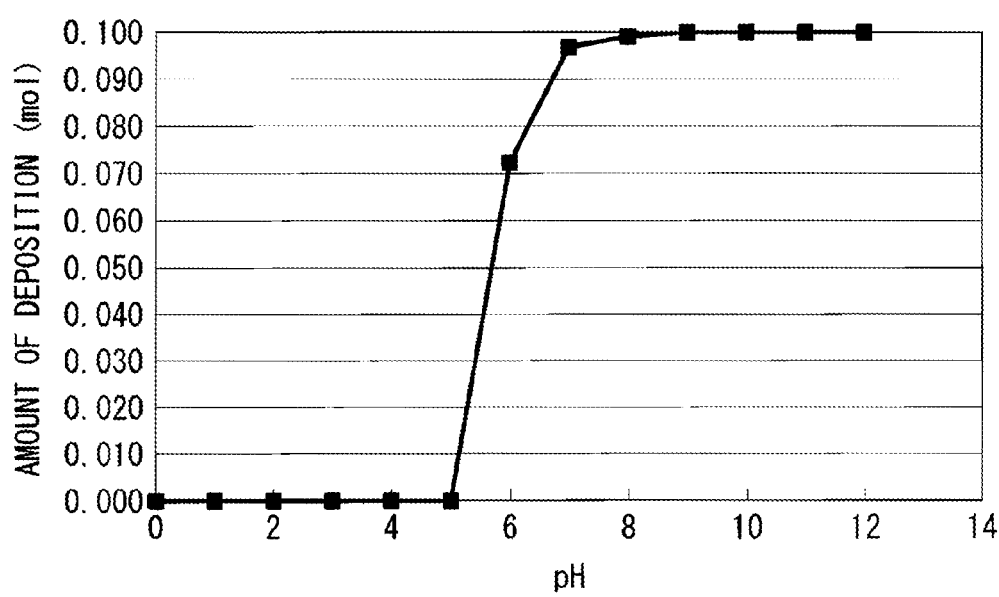
FIG. 3 shows simulation results for the pH dependency of the amount of calcium carbonate deposited.

First, the deposition behaviors of gypsum, silica, and calcium carbonate in water will be explained. FIG. 2 shows simulation results for the pH dependency of the amount of gypsum deposited. FIG. 3 shows simulation results for the pH dependency of the amount of calcium carbonate deposited. In the figures, the abscissa is pH, and the ordinate is the amount of gypsum or calcium carbonate deposited (mol). Using a simulation software manufactured by OLI, the simulation was performed under the conditions where 0.1 mol/L of each solid component was mixed with water, and $H_2SO_4$ and $Ca(OH)_2$ were added as an acid and an alkali, respectively.

Figure 4:
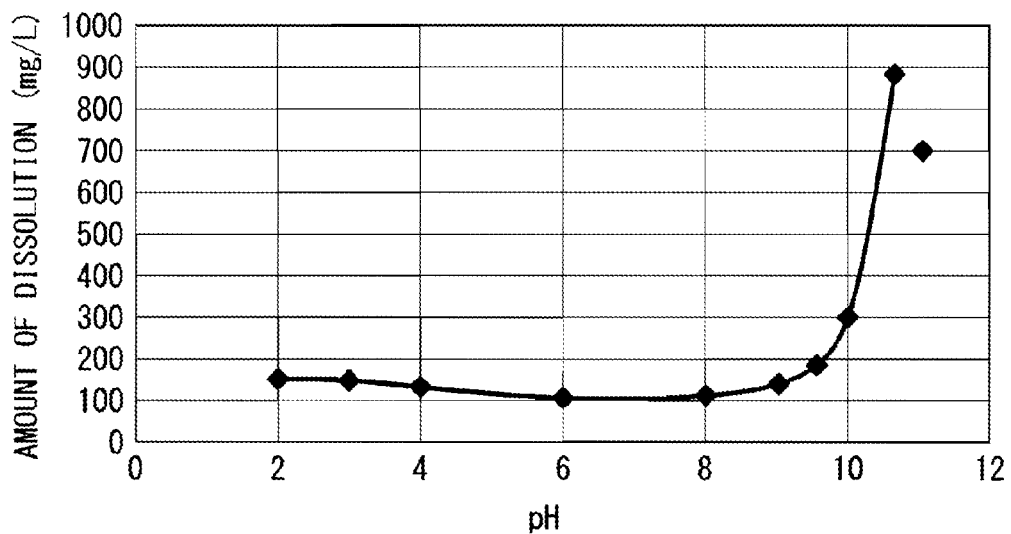
FIG. 4 is a graph showing the pH dependency of the amount of silica dissolved.

FIG. 4 is a graph showing the pH dependency of the amount of silica dissolved (source: FIG. 4 of U.S. Pat. No. 7,815,804). In the figure, the abscissa is pH, and the ordinate is the amount of silica dissolved (mg/L).

From FIG. 2, it can be understood that gypsum deposition has no pH dependency, and deposition is possible over the entire pH range. However, when a calcium scale inhibitor is added, in a high-pH region, gypsum is present in the state of being dissolved in water. From FIG. 3, calcium carbonate is deposited when the pH is more than 5. From FIG. 4, silica tends to dissolve in water when the pH is 10 or more.

<Pretreatment>

In the case where the water to be treated is industrial waste water, etc., before the water to be treated flows into the first upstream side precipitating section 70, a step of removing oils, floating particles, and the like from the water to be treated and a step of removing organic substances by a biological treatment or a chemical oxidation treatment are performed.

<First Deaerating Step>

In the water treatment system 1 of FIG. 1, the water to be treated before flowing into the first deaerating section 73 is adjusted to a low pH. Carbonic acid in the water to be treated is in the following equilibrium depending on the pH of the water to be treated.

{Chemical Formula 1}

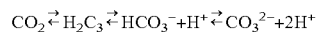

(1)

In the case where the pH is as low as 6.5 or less, it is mainly present as $HCO_3^-$ and $CO_2$ in the water to be treated.

The water to be treated containing $CO_2$ flows into the first deaerating section 73. $CO_2$ is removed from the water to be treated in the first deaerating section 73. When the water to be treated has been previously adjusted to a pH at which carbonate ions are present as $CO_2$, carbon dioxide can be efficiently removed.

The water to be treated, whose carbonate ion concentration has been reduced in the first deaerating step, is fed to the first upstream side precipitating section 70.

<First Upstream Side Precipitating Step>

In the first upstream side precipitating section 70, some of Ca ions and carbonate ions are previously removed from the water to be treated as calcium carbonate.

In the case where metal ions other than Ca ions are contained in the water to be treated, in the first upstream side precipitating section 70, some of the metal ions are previously removed from the water to be treated as a metal compound having low solubility in water. This metal compound is mainly a metal hydroxide, but may also include a carbonate.

In the precipitating tank 71, $Ca(OH)_2$ and an anionic polymer (manufactured by Mitsubishi Heavy Industries Mechatronics Systems, Ltd., trade name: Hishifloc H305) are loaded to the water to be treated, and the pH in the precipitating tank 71 is controlled to 4 or more and 12 or less, and preferably 8.5 or more and 12 or less.

As shown in FIG. 3, the solubility of calcium carbonate is low in this pH range. When calcium carbonate is supersaturated, calcium carbonate is deposited and precipitated at the bottom of the precipitating tank 71.

The solubility of a metal compound depends on pH. A more acidic pH leads to a higher solubility of metal ions in water. For many metal compounds, the solubility is low in the above pH range. In the above pH range, a metal compound having low solubility in water aggregates in the precipitating tank 71, resulting in precipitation at the bottom of the precipitating tank 71.

The precipitated calcium carbonate and metal compound are discharged from the bottom of the precipitating tank 71.

Mg ions form salts that are poorly soluble in water, and thus are components that tend to be deposited as scales. $Mg(OH)_2$ is deposited at pH 10 or more.

In the case where the water to be treated containing Mg ions is treated by the water treatment system 1 of this reference embodiment, the pH of the water to be treated in the precipitating tank 71 is adjusted to a pH at which a magnesium compound (mainly magnesium hydroxide) is deposited. Specifically, the pH of the water to be treated is adjusted to 10 or more, preferably 10.5 or more, and more preferably 11 or more. Accordingly, a magnesium compound is deposited from the water to be treated, precipitated at the bottom of the precipitating tank 71, and removed. As a result, some of Mg ions in the water to be treated are removed, resulting in a decrease in the concentration of Mg ions in the water to be treated.

In the above case, it is preferable that the water to be treated after being discharged from the first upstream side precipitating section 70 is adjusted to a pH at which the above magnesium compound is soluble. Specifically, the pH is adjusted to less than 10. Accordingly, the formation of scales in devices and steps on the downstream side, particularly the first demineralizing section 10a and the first demineralizing step, can be inhibited.

In the case where two or more stages of precipitating tanks 71 are provided, Mg ions in the water to be treated can be reliably removed, and the concentration of Mg ions in the water to be treated fed to the downstream side can be reduced.

The supernatant in the precipitating tank 71, which is the water to be treated, is discharged from the precipitating tank 71. $FeCl_3$ is added to the discharged water to be treated, and solids in the supernatant, such as calcium carbonate and a metal compound, aggregate with $Fe(OH)_3$.

The water to be treated is fed to the filtration device 72. The solids aggregated with $Fe(OH)_3$ are removed through the filtration device 72.

In the case where the first deaerating step is performed after the first upstream side precipitating step, the pH of the water to be treated is adjusted to a pH at which carbonate ions can be present as $CO_2$, specifically 6.5 or less.

Incidentally, depending on the properties of the water to be treated, the first deaerating step and the first upstream side precipitating step may be omitted.

In the case where an ion-exchange equipment is installed, Ca ions in the water to be treated are removed by the ion-exchange equipment. In the case where Mg ions are contained in the water to be treated, the Mg ions are also removed by the ion-exchange equipment.

In the case where gypsum in the raw water is supersaturated, seed crystals of gypsum are loaded to the water to be treated in the upstream side crystallizing section installed immediately after the filtration device 72, and gypsum is crystallized, thereby reducing the concentration of gypsum in the water to be treated. The water to be treated having a reduced concentration of gypsum is fed to the first demineralizing section 10a.

<First Scale Inhibitor Supplying Step>

The control section 32a of the first scale inhibitor supplying section 30a opens the valve V1a and supplies a predetermined amount of calcium scale inhibitor to the water to be treated from the tank 31a. The control section 32a adjusts the opening of the valve V1a so that the concentration of the calcium scale inhibitor is a predetermined value set according to the properties of the water to be treated.

In the case where Mg ions are contained in the water to be treated, a magnesium scale inhibitor is supplied to the water to be treated in the first scale inhibitor supplying step in the same manner as above. In this case, the calcium scale inhibitor and the magnesium scale inhibitor are stored in the tank of each of two or more first scale inhibitor supplying sections, and each control section adjusts the amounts of calcium scale inhibitor and magnesium scale inhibitor to be supplied.

<First pH Adjusting Step>

The control section 42a of the first pH adjusting section 40a controls the pH of the water to be treated at the entrance of the first demineralizing section 10a to such a value that silica is soluble in the water to be treated. Specifically, the pH of the water to be treated fed to the first demineralizing section 10a is adjusted to 10 or more, preferably 10.5 or more, and more preferably 11 or more.

The pH meter 43a measures the pH of the water to be treated at the entrance of the first demineralizing section 10a. The control section 42a adjusts the opening of the valve V2a so that the value measured by the pH meter 43a is a predetermined pH control value, and allows an alkali to be loaded to the water to be treated from the tank 41a.

<First Demineralizing Step>

In the first demineralizing section 10a, the pH-adjusted water to be treated is treated. In the case where the first demineralizing section 10a is a reverse osmosis membrane device, the water that has passed through the reverse osmotic membrane is recovered as treated water. Ions and scale inhibitors contained in the water to be treated cannot pass through the reverse osmosis membrane. Therefore, on the non-permeate side of the reverse osmosis membrane, there is concentrated water having a high concentration of ions. Also in the case where other demineralizers, such as a capacitive de-ionization device, are used, for example, the water to be treated is separated into treated water and concentrated water having a high concentration of ions (first concentrated water).

As shown in FIG. 4, as a result of the first demineralizing step, silica is contained in the first concentrated water in the state of being dissolved in the water to be treated. Even in the case where gypsum and calcium carbonate in the first concentrated water are concentrated to the saturation concentration or higher, the production of scales is suppressed by the calcium scale inhibitor.

In the case where Mg ions are contained in the water to be treated, the concentration of Mg ions contained in the first concentrated water increases as a result of the first demineralizing step. However, the production of scales containing magnesium is suppressed by the magnesium scale inhibitor.

The first concentrated water is fed toward the first crystallizing section 20a.

<First Crystallizing Step>

The first concentrated water discharged from the first demineralizing section 10a is stored in the first crystallizing tank 21a of the first crystallizing section 20a. The control section 24a of the first seed crystal supplying section 22a opens the valve V3a and adds seed crystals of gypsum to the first concentrated water in the first crystallizing tank 21a from the tank 23a.

The pH of the first concentrated water from the first demineralizing section 10a is 10 or more. As mentioned above, gypsum is in the state of being dissolved in water in a high-pH region where a calcium scale inhibitor is present. However, when seed crystals are sufficiently present, even when a scale inhibitor is present, gypsum is crystallized using the seed crystals as nuclei. In the water treatment system 1 of FIG. 1, the crystal-grown gypsum having a large diameter (e.g., having a particle diameter of 10 μm or more, more preferably 20 μm or more) is precipitated at the bottom of the first crystallizing tank 21a. The precipitated gypsum is discharged from the bottom of the first crystallizing tank 21a.

Meanwhile, when the pH 10 is or more, silica is present in the state of being dissolved in the first concentrated water in the first crystallizing tank 21a. Even in the case where the concentration of silica in the first concentrated water exceeds the saturation solubility, because seed crystals of silica are not present, silica is deposited as floating matters in a colloidal form or the like and unlikely to be precipitated.

With reference to FIG. 3, calcium carbonate tends to be deposited at pH 10 or more. However, because the calcium scale inhibitor has been added, the deposition of calcium carbonate is suppressed in the first crystallizing tank 21a. In addition, in the case where the first upstream side precipitating section or the first deaerating section is provided, the concentration of calcium carbonate has been previously reduced. As a result, in the first crystallizing tank 21a, calcium carbonate is unlikely to be crystallized using the seed crystals of gypsum as nuclei.

Incidentally, although gypsum is crystallized independent of pH when seed crystals of gypsum are present, the crystallization rate increases with a decrease in pH.

Figure 5:
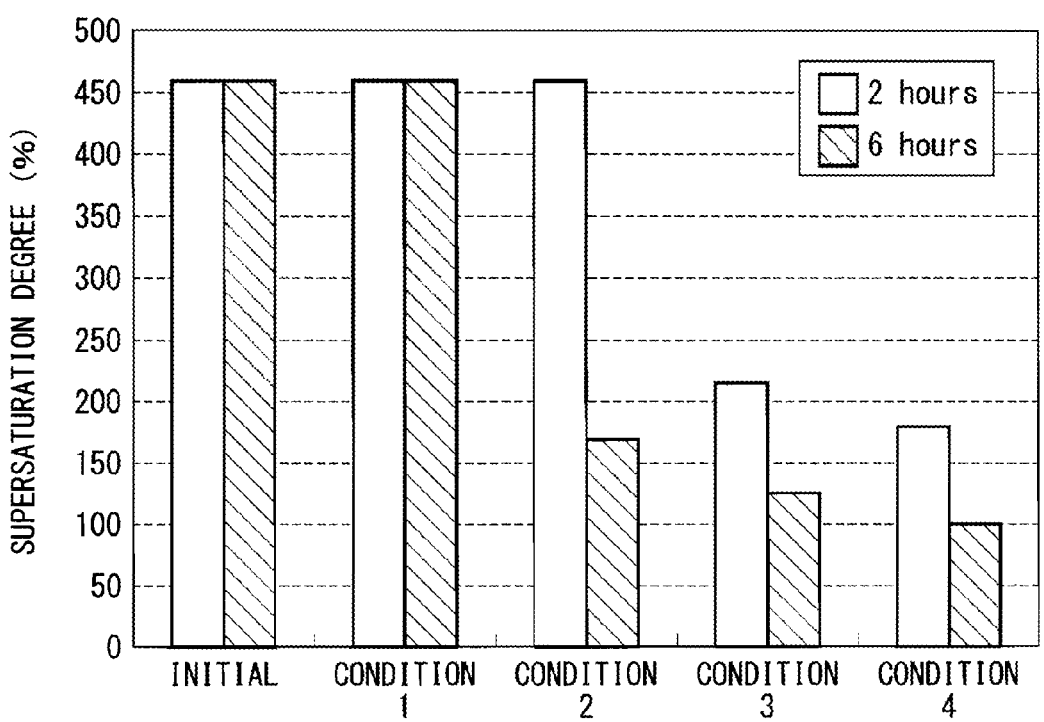
FIG. 5 shows the results of gypsum deposition experiments performed using simulated water in which gypsum is supersaturated with changing the pH of the simulated water.

FIG. 5 shows the result of gypsum deposition experiments with changing the pH of simulated water in the case where a scale inhibitor (FLOCON260) is added to simulated water (containing $Ca^{2+}$, $SO_4^{2-}$, $Na^+$, and $Cl^-$) in which gypsum is supersaturated. The experimental conditions are as follows:

The degree of gypsum supersaturation in simulated water (25° C.): 460%,

The amount of scale inhibitor to be added: 2.1 mg/L, pH: 6.5 (Condition 1), 5.5 (Condition 2), 4.0 (Condition 3), 3.0 (Condition 4), The amount of seed crystals to be added: 0 g/L.

Two hours and 6 hours immediately after the pH adjustment, the concentration of Ca in the simulated water treated under each condition was measured using an atomic absorption spectrometer (manufactured by Shimadzu Corporation, AA-7000), and the degree of supersaturation was calculated. The results are shown in FIG. 5. In the figure, the ordinate is the degree of supersaturation (%).

With reference to FIG. 5, even under conditions where seed crystals are absent, the crystallization rate increases with a decrease in pH. From this, it can be understood that in the case where seed crystals are present, gypsum is crystallized even under Condition 1 (pH 6.5), and the relation of the crystallization rate is such that the crystallization rate increases with a decrease in pH as shown in FIG. 5.

In the case where carbonate ions are contained in the water to be treated, under low-pH conditions, carbonate ions are removed from the water to be treated as $CO_2$ as in chemical formula (1). In addition, as can be understood from FIG. 3, in the case where the pH is low, calcium carbonate is in a dissolved state.

From these results, when the first crystallizing step is performed under low-pH conditions, because of the low content of calcium carbonate and silica, high-purity gypsum is crystallized and recovered from the bottom of the first crystallizing tank 21a. In the case where the first crystallizing step is performed at low pH, a third pH adjusting section (not shown) that supplies an acid as a pH adjuster is installed in the first crystallizing tank 21a or in the flow path between the first demineralizing section 10a and the first crystallizing tank 21a. The pH adjusting section has the same configuration as the below-mentioned second pH adjusting section.

Meanwhile, in order to change the pH in the course of water treatment, it is necessary to supply a large amount of chemicals (acid or alkali). The use of an acid or an alkali leads to an increase in the amount of ions transferred to the downstream side of the first crystallizing section 20a, and this causes an increase in the power of demineralizing sections on the downstream side (in FIG. 1, the first demineralizing section 10b or the downstream side demineralizing section 60). In terms of operation cost, it is more advantageous that the pH is not changed between the first demineralizing step and the first crystallizing step.

Figure 6:
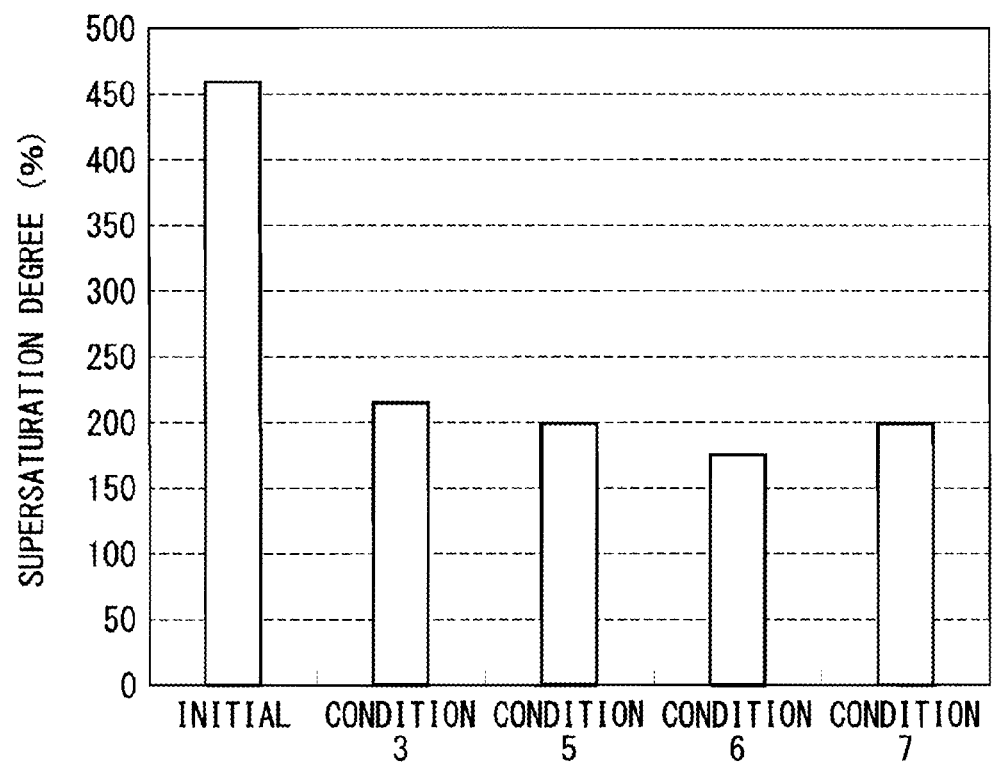
FIG. 6 shows the results of gypsum deposition experiments performed using simulated water in which gypsum is supersaturated with changing the concentration of seed crystals.

The gypsum crystallization rate depends on the loading of seed crystals. FIG. 6 shows the results of gypsum deposition experiments with changing the amount of seed crystals to be added in the case where a calcium scale inhibitor (FLOCON260) is added to simulated water. The experimental conditions were the same as in FIG. 5 except that the pH was 4.0, and that gypsum ($CaSO_4 \cdot 2H_2O$) was added as seed crystals in the following amounts:

The amount of seed crystals to be added: 0 g/L (Condition 3), 3 g/L (Condition 5), 6 g/L (Condition 6), 3 g/L (Condition 7).

Under Conditions 5 and 6, seed crystals and sulfuric acid for pH adjustment were added to the simulated water having added thereto a scale inhibitor. Under Condition 7, seed crystals pre-immersed in the above scale inhibitor were added to the simulated water having added thereto a scale inhibitor, and sulfuric acid was added for pH adjustment.

Two hours immediately after the pH adjustment, the concentration of Ca in the simulated water treated under each condition was measured by the same technique as in FIG. 5. In FIG. 6, the ordinate is the degree of supersaturation (%).

From the results of FIG. 6, it can be understood that although the degree of supersaturation was 215% under Condition 3 where seed crystals are not added, the degree of supersaturation decreases to 199% (Condition 5) and 176% (Condition 6) with an increase in the concentration of seed crystals, leading to an increase in the gypsum deposition rate. Also under high-pH conditions, similarly, the gypsum deposition rate tends to increase with an increase in the loading of seed crystals. Condition 5 and Condition 7 are the same test conditions, except for whether the used seed crystals are not immersed or immersed in a scale inhibitor. Also under Condition 7 where seed crystals have a scale inhibitor previously adhering thereto, the degree of supersaturation is 199%, and it has been confirmed that gypsum is deposited at the same level as under Condition 5. That is, the results under Condition 5 and 7 show that independent of the immersion time of seed crystals in a calcium scale inhibitor, when the pH is reduced to 4.0, the function of the scale inhibitor is reduced.

Figure 7:
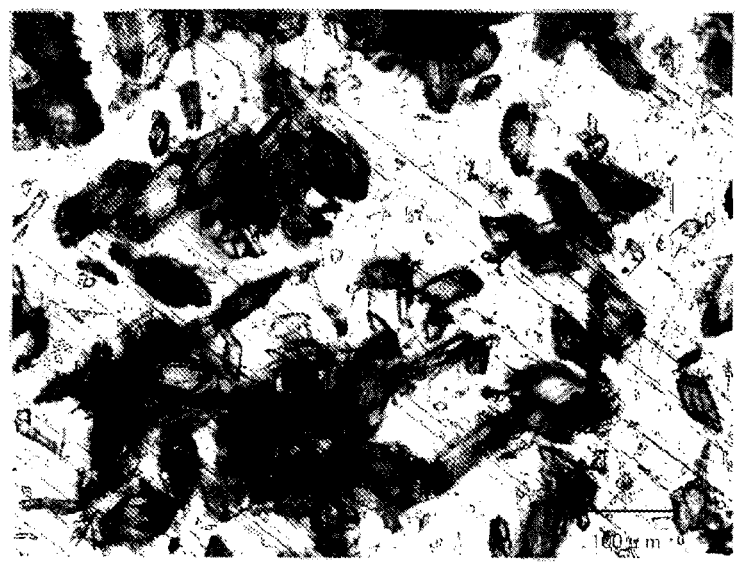
FIG. 7 is a microphotograph of gypsum crystallized under Condition 5.
Figure 8:
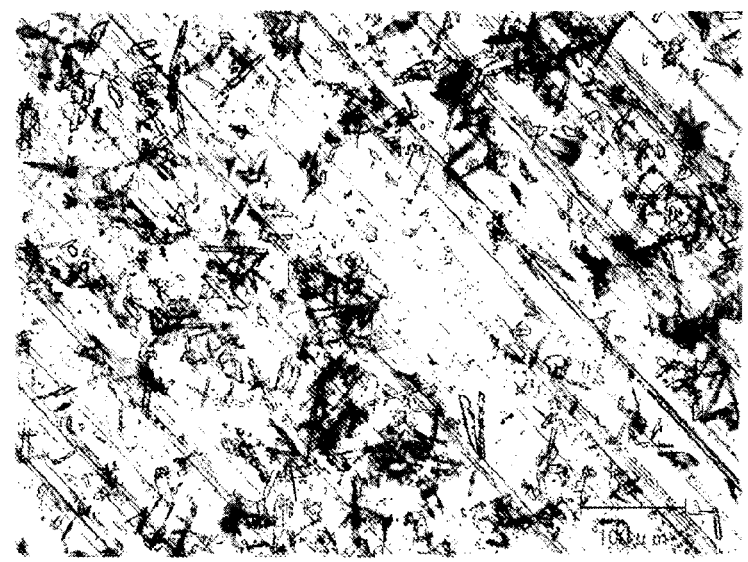
FIG. 8 is a microphotograph of gypsum crystallized under Condition 3.

FIGS. 7 and 8 each show a microphotograph of gypsum resulting from crystallization. FIG. 7 shows results under Condition 5 (seed crystals added), and FIG. 8 shows results under Condition 3 (no seed crystals added). Under Condition 5, gypsum having a larger size was deposited than under Condition 3. Generally, the water content decreases with an increase in the size of deposited gypsum. A low water content leads to high-purity gypsum. When the average particle diameter is 10 µm or more, preferably 20 µm or more, the resulting gypsum has a sufficiently reduced water content. The "average particle diameter" in the present invention is a particle diameter measured by the method specified in JIS Z 8825 (laser diffractometry).

<First Precipitating Step>

The supernatant (first concentrated water) in the first crystallizing section 20*a* is fed to the first precipitating section 50*a*. In the first precipitating section 50*a*, $Ca(OH)_2$ and an anionic polymer (Hishifloc H305) are loaded to the first concentrated water after the crystallizing step, and the pH in the first precipitating tank 51*a* is controlled to 4 or more and 12 or less, and preferably 8.5 or more and 12 or less. In the first precipitating tank 51*a*, calcium carbonate and a metal compound are precipitated and removed from the first concentrated water. The precipitated calcium carbonate and metal compound having low solubility in water are discharged from the bottom of the first precipitating tank 51*a*.

The water to be treated, which is the supernatant in the first precipitating tank 51*a*, is discharged from the first precipitating tank 51*a*. $FeCl_3$ is added to the discharged water to be treated, and solids in the water to be treated, such as calcium carbonate and a metal compound, aggregate with $Fe(OH)_3$.

The water to be treated is fed to the first filtration device 52*a*. The solids aggregated with $Fe(OH)_3$ are removed through the first filtration device 52*a*.

Silica in the supernatant in the first crystallizing section 20*a* may be removed from the first concentrated water in the first precipitating step, or may also be fed to the downstream side without being removed.

Whether silica is removed in the first precipitating step is determined according to the properties of the water to be treated or the first concentrated water.

In the case where silica is not removed, the first precipitating step is performed without supplying seed crystals of silica and a precipitant for silica to the first precipitating tank 51*a*. In this case, silica is separated from the treated water in demineralizing sections located on the downstream side (the first demineralizing section 10*b* and the downstream side demineralizing section 60).

In the case where silica is removed, at least one of seed crystals of silica and a precipitant for silica is supplied into the first concentrated water in the first precipitating section 50*a* from a supply section (not shown). The seed crystals of silica are a silica gel, for example, and the precipitant for silica is $MgSO_4$ or Na aluminate ($Na[Al(OH)_4]$), for example. In the case where silica is removed, it is preferable that the first concentrated water in the first precipitating tank 51*a* is adjusted to pH 8 or more and 10 or less. In the case where seed crystals of silica are used, silica is crystallized using the seed crystals as nuclei. In the case where $MgSO_4$ is used as a precipitant for silica, magnesium silicate is deposited. The crystallized silica or the crystallized magnesium silicate is precipitated at the bottom of the first precipitating tank 51*a* and discharged from the bottom of the first precipitating tank 51*a*.

In the case where Mg ions are contained in the water to be treated, Mg ions react with silica in the first concentrated water in the first precipitating step, resulting in precipitation. The steps for silica/Mg ion removal vary depending on the balance between the content of Mg ions and the content of silica in the first concentrated water in the first precipitating tank 51*a*.

In the case where the first concentrated water in the first precipitating step has a lower concentration of Mg ions relative to the silica content, Mg ions are consumed by precipitation with silica. In order to remove an excess of silica that is not consumed by precipitation with Mg ions, a precipitant for silica ($MgSO_4$) is supplied. With respect to the amount of precipitant for silica to be supplied, according to the content of silica and the content of Mg ions in the first precipitating step, the precipitant is supplied in such an amount that the excess of silica is consumed.

In the case where the first concentrated water in the first precipitating step has a higher concentration of Mg ions relative to the silica content, Mg ions remain as a result of the precipitation of Mg ions and silica. When the first concentrated water having a high concentration of residual Mg ions is discharged from the first precipitating tank 51*a*, scales containing Mg may be deposited in demineralizing sections of subsequent stages (the first demineralizing section 10*b* in FIG. 1; in the case of the first precipitating section on the most downstream, the downstream side demineralizing section 60).

Thus, the first concentrated water in the first precipitating tank 51*a* is adjusted to such a value that a magnesium compound (mainly magnesium hydroxide) can be deposited. Accordingly, a magnesium compound is precipitated in the first precipitating tank 51*a*, thereby reducing the concentration of Mg ions in the first concentrated water in the first precipitating tank 51*a*. Further, after the first precipitating step, the first concentrated water discharged from the first precipitating tank 51*a* is adjusted to a pH at which the magnesium compound is soluble, specifically to a pH of less than 10. Accordingly, the deposition of scales containing Mg in a demineralizing section can be suppressed.

In the case where the treatment is performed in several stages, the first concentrated water that has passed through the first filtration device 52a of the first water treatment section of the previous stage flows into the water treatment section of the subsequent stage as water to be treated. In the water treatment section of the subsequent stage, the steps from the first scale inhibitor supplying step to the first precipitating step mentioned above are performed.

<Downstream Side Demineralizing Step>

The concentrated water (first concentrated water) that has passed through the first precipitating section 50b located on the most downstream of the water to be treated is fed to the downstream side demineralizing section 60. The water that has passed through the downstream side demineralizing section 60 is recovered as treated water. The concentrated water in the downstream side demineralizing section 60 is discharged out of the system. The installation of the downstream side demineralizing section 60 makes it possible to further recover treated water from water that has been treated in a water treatment section. Accordingly, the water recovery is improved.

In the water treatment system 1 of this reference embodiment, ions are concentrated in the first demineralizing section 10. However, gypsum, calcium carbonate, silica, etc., have been removed in the first crystallizing section, the first precipitating section, etc. Accordingly, the water flowing into the downstream side demineralizing section 60 has a smaller number of moles of ions than before the treatment. Accordingly, the osmotic pressure is low in the first demineralizing section 10b or the downstream side demineralizing section 60 located downstream, and the required power is reduced.

An evaporator (not shown in FIG. 1) may be installed on the downstream on the concentrated-water side of the downstream side demineralizing section 60. In the evaporator, water is evaporated from the concentrated water, and ions contained in the concentrated water are deposited as a solid and recovered as a solid. Because water is recovered on the upstream side of the evaporator, and the amount of concentrated water significantly decreases, the evaporator can be reduced in size, and the energy required for evaporation can be reduced.

First Embodiment

Figure 9:
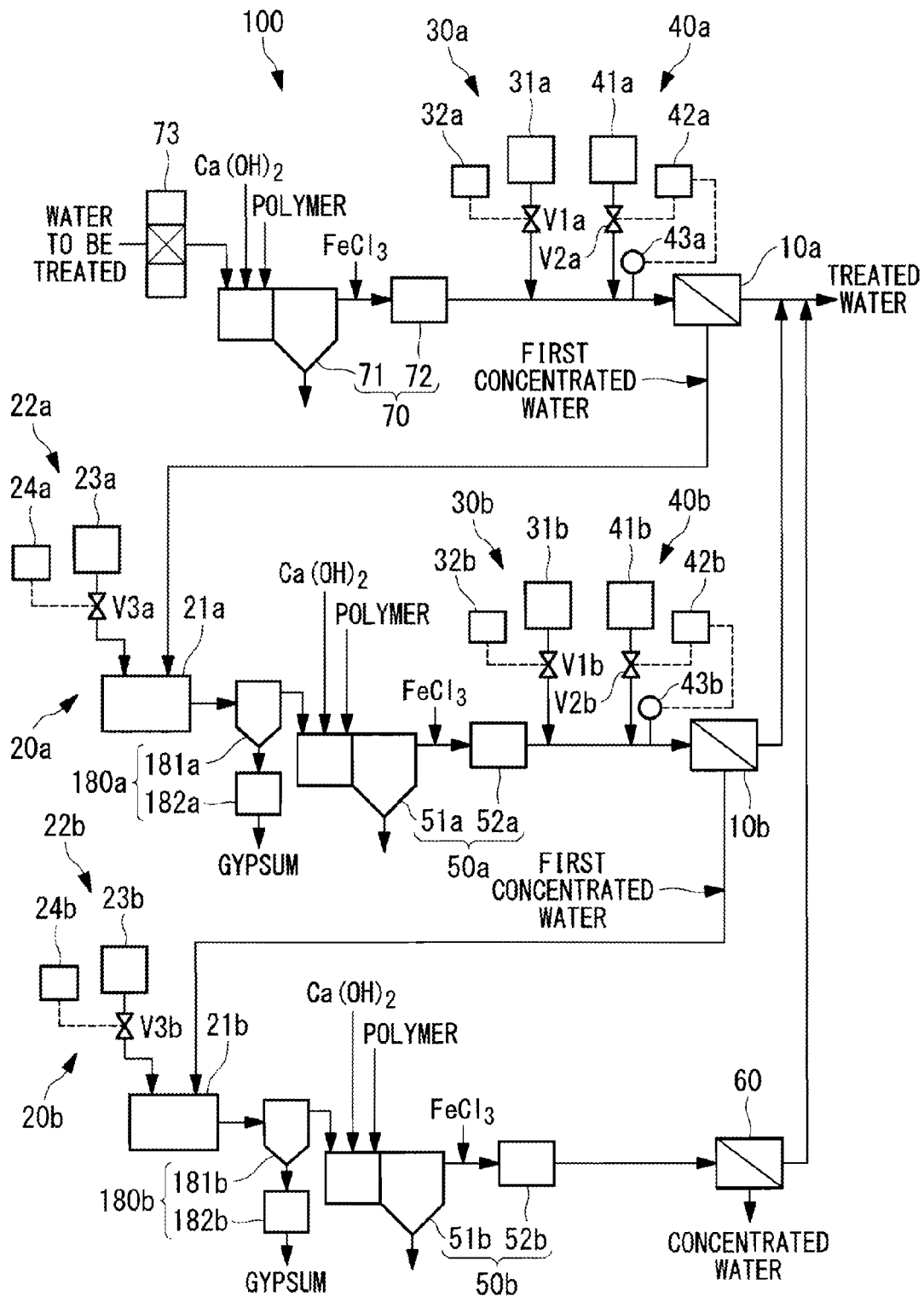
FIG. 9 is a schematic diagram of a water treatment system according to a first embodiment.

FIG. 9 is a schematic diagram of a water treatment system of the first embodiment of the present invention. In FIG. 9, the same configurations as in the first reference embodiment are indicated with the same reference numerals. In the water treatment system 100 of the first embodiment, a first separating section 180 (180a, 180b) is installed on the downstream side of the first crystallizing sections 20a and 20b. The water treatment system 100 of FIG. 9 is configured such that two water treatment sections are connected in the flow direction of the water to be treated. In the water treatment system 100 of this embodiment, depending on the properties of the water to be treated, the number of water treatment sections may be one, and it is also possible that three or more water treatment sections are connected.

In FIG. 9, the first separating section 180 (180a, 180b) includes a classifier 181 (181a, 181b) and a dehydrator 182 (182a, 182b). The classifiers 181a and 181b are liquid cyclones, for example. The dehydrators 182a and 182b are belt filters, for example.

Although the first separating section 180 has only one classifier installed in FIG. 9, it is also possible that two or more classifiers are connected in series in the flow direction of the water to be treated.

In the water treatment system 100 of the first embodiment, the water to be treated is treated through the same steps as in the first reference embodiment, except that the first separating step is performed immediately after the first crystallizing step.

<First Separating Step>

First concentrated water in the first crystallizing tanks 21a and 21b is transferred to the first separating sections 180a and 180b. The first concentrated water transferred here is water containing solid matters deposited in the first crystallizing tanks 21a and 21b.

The first concentrated water discharged from the first crystallizing tanks 21a and 21b contains gypsum having various particle diameters, as well as calcium carbonate and silica deposited due to the exceeding of the saturation concentration. Because the deposition of calcium carbonate and silica has taken place in the absence of seed crystals, they have small diameters or are floating matters in a colloidal form.

When the first concentrated water flows into the classifiers 181a and 181b, gypsum having a predetermined size, for example, gypsum having an average particle diameter of 10 μm or more, sediments at the bottom of the classifiers 181a and 181b, and gypsum having a small particle diameter, calcium carbonate, and silica remain in the supernatant. The gypsum sedimented at the bottom of the classifiers 181a and 181b is further dehydrated by the dehydrators 182a and 182b and recovered. The supernatant containing gypsum having a small particle diameter, calcium carbonate, and silica is fed to the first precipitating sections 50a and 50b.

In this embodiment, seed crystals are added to cause crystallization. Therefore, gypsum having an average particle diameter of 10 μm or more is mainly deposited, and the proportion of gypsum having a small diameter is low. Through the first separating step, gypsum having a low water content and containing no impurities (i.e., high-purity gypsum) can be separated and recovered with high recovery.

Some of the gypsum recovered in the first separating sections 180a and 180b may be circulated through the seed crystal tanks 23a and 23b as seed crystals.

First Example of Second Embodiment

Water that is an object to be treated in the present invention (water to be treated) contains $Ca^{2+}$, $SO_4^{2-}$, and carbonate ions. Specifically, the water to be treated (raw water) is saline water, sewage, industrial waste water, blowdown water from a cooling tower, or the like. The water to be treated may also contain metal ions, such as Mg ions.

Figure 10:
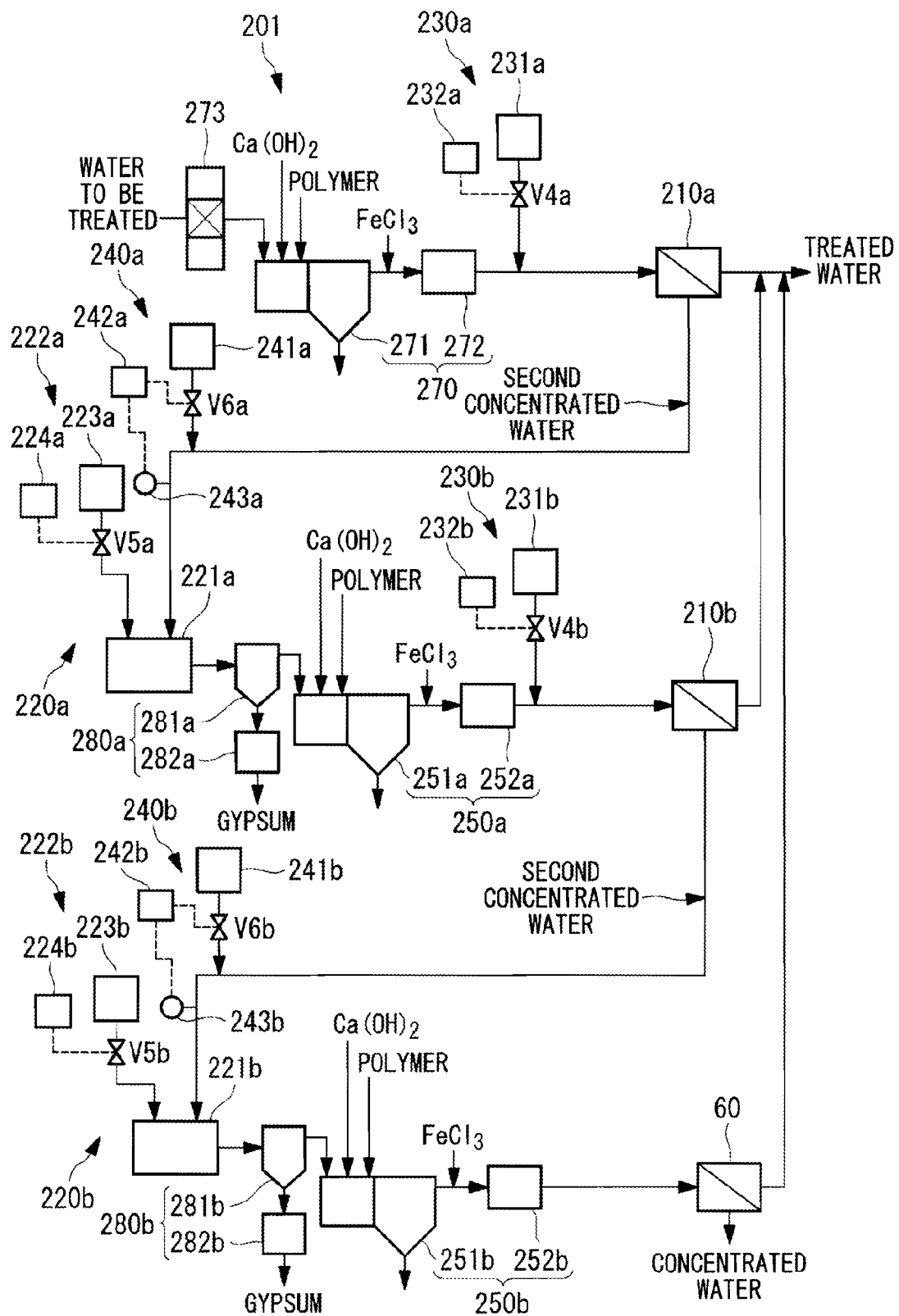
FIG. 10 is a schematic diagram of a water treatment system according to a first example of a second embodiment.

FIG. 10 is a schematic diagram of a water treatment system of the first example of the second embodiment of the present invention. The water treatment system 201 of FIG. 10 is configured such that two water treatment sections are connected in the flow direction of the water to be treated. Depending on the properties of the water to be treated, the number of water treatment sections may be one, and it is also possible that three or more water treatment sections are connected.

In the water treatment system 201 of the first example of the second embodiment, each water treatment section includes, from the upstream side of the water to be treated, a second demineralizing section 210 (210a, 210b) and a second crystallizing section 220 (220a, 220b). The concentration sides of the second demineralizing sections 210a and 210b are connected to the second crystallizing sections 220a and 220b, respectively. The water treatment section includes a second scale inhibitor supplying section 230 (230a, 230b) in the flow path on the upstream side of each second demineralizing section 210 (210a, 210b).

The second scale inhibitor supplying sections 230a and 230b are each made up of a tank 231 (231a, 231b), a valve V4 (V4a, V4b), and a control section 232 (232a, 232b). The control sections 232a and 232b are connected to the valves V4a and V4b, respectively. The tanks 231a and 231b of the second scale inhibitor supplying sections 230a and 230b store a scale inhibitor.

The scale inhibitor used in the first example of this embodiment serves to inhibit the deposition of scales containing calcium in the water to be treated. It will be hereinafter referred to as "calcium scale inhibitor".

The calcium scale inhibitor suppresses the crystal nucleation of gypsum or calcium carbonate in the water to be treated. At the same time, it adheres to the surface of crystal nucleus of gypsum or calcium carbonate contained in the water to be treated (seed crystals, small-diameter scales deposited due to the exceeding of the saturation concentration, etc.), and functions to suppress the crystal growth of gypsum or calcium carbonate. Alternatively, there is another type of calcium scale inhibitor, which has the function of dispersing particles in the water to be treated (inhibiting aggregation), such as deposited crystals.

Examples of calcium scale inhibitors include phosphonic-acid-based scale inhibitors, polycarboxylic-acid-based scale inhibitors, and mixtures thereof. A specific example is FLOCON260 (trade name, manufactured by BWA).

FIG. 10 shows tanks 231a and 231b. The tanks 231a and 231b store a calcium scale inhibitor.

In FIG. 10, the second demineralizing sections 210a and 210b are reverse osmosis membrane devices. In addition, the second demineralizing sections 210a and 210b may also be electrodialyzers (ED), electro dialysis reversal devices (EDR), electro de-ionization devices (EDI), ion exchangers (IEx), capacitive de-ionization devices (CDI), nanofilters (NF), evaporators, etc.

Here, in a nanofilter (NF), an electrodialyzer (ED), an electro dialysis reversal device (EDR), an electro de-ionization device (EDI), and a capacitive de-ionization device (CDI), scale components (divalent ions, $Ca^{2+}$, $Mg^{2+}$, etc.) are selectively removed, while monovalent ions such as $Na^+$ and $Cl^-$ permeate. The use of these demineralizers suppresses an increase in the ion concentration of ions that serve as scale components in concentrated water. Accordingly, the water recovery can be improved, and also energy saving (e.g., the reduction of pump power, etc.) can be achieved.

In addition, in the case where the water to be treated is blowdown water from a cooling tower, the reclaimed water does not have to be pure water, and what is necessary is that scale components (divalent ions, $Ca^{2+}$, $Mg^{2+}$, etc.) are removed. Accordingly, it is advantageous to use a nanofilter (NF), etc.

Although only one second demineralizing section 210a/210b is shown in FIG. 10, the system may also be configured such that two or more demineralizers are connected in parallel or in series in the flow direction of the water to be treated.

The second crystallizing section 220 (220a, 220b) is made up of a second crystallizing tank 221 (221a, 221b) and a second seed crystal supplying section 222 (222a, 222b). The second seed crystal supplying sections 222a and 222b are connected to the second crystallizing tanks 221a and 221b, respectively. The second seed crystal supplying sections 222a and 222b have a seed crystal tank 223 (223a, 223b), a valve V5 (V5a, V5b), and a control section 224 (224a, 224b). The control sections 224a and 224b are connected to the valves V5a and V5b, respectively. The seed crystal tanks 223a and 223b store gypsum particles as seed crystals.

In the water treatment system 201 of FIG. 10, a second precipitating section 250 (250a, 250b) may be installed on the downstream side of the second crystallizing sections 220a and 220b. The second precipitating sections 250a and 250b each include a second precipitating tank 251 (251a, 251b) and a second filtration device 252 (252a, 252b).

The water treatment system 201 includes a downstream side demineralizing section 60 on the downstream side of the water to be treated of the second crystallizing section 220b located on the most downstream.

In FIG. 10, the downstream side demineralizing section 60 is a reverse osmosis membrane device. The downstream side demineralizing section 60 may also be an electrodialyzer (ED), an electro dialysis reversal device (EDR), an electro de-ionization device (EDI), an ion exchanger, a capacitive de-ionization device (CDI), a nanofilter (NF), an evaporator, etc.

An evaporator (not shown in FIG. 10) may be installed on the downstream on the concentrated-water side of the downstream side demineralizing section 60. In the evaporator, water is evaporated from the concentrated water, and ions contained in the concentrated water are deposited as a solid and recovered as a solid. Because water is recovered on the upstream side of the evaporator, and the amount of concentrated water significantly decreases, the evaporator can be reduced in size, and the energy required for evaporation can be reduced.

In the water treatment system 201 of the first example of the second embodiment, a second pH adjusting section 240 (240a, 240b) may be installed between the second demineralizing section 210 and the second crystallizing section 220. The second pH adjusting section 240 is made up of a tank 241 (241a, 241b), a valve V6 (V6a, V6b), a pH meter 243 (243a, 243b), and a control section 242 (242a, 242b). The tank 241 has stored therein an acid as a pH adjuster. The acid used may be hydrochloric acid, sulfuric acid, nitric acid, or the like, for example. Sulfuric acid is particularly preferable because $SO_4^{2-}$ is removed as gypsum in the crystallizing step, and thus the amount of ions that reach the demineralizing section on the downstream side can be reduced. The control section 242 is connected to the valve V6 and the pH meter 243. The pH meter 243 may be installed in the flow path between the second demineralizing section 210 and the second crystallizing section 220 as shown in FIG. 10, or may also be installed in the second crystallizing tank 221.

In the water treatment system 201, a precipitating tank 271 and a filtration device 272 are installed as a second upstream side precipitating section 270 on the upstream side of the second scale inhibitor supplying section 230a located on the most upstream of the water to be treated. The second upstream side precipitating section 270 has the same configuration as the first precipitating tank 251 and the first filtration device 252 of the first precipitating section 250.

In particular, in the case where Mg ions are contained in the water to be treated, the second upstream side precipitating section 270 can be configured such that two or more precipitating tanks 271 are connected in series in the flow direction of the water to be treated.

In the water treatment system 201, a second deaerating section 273 may be provided on the upstream side of the second upstream side precipitating section 270 as shown in FIG. 10. Specifically, the second deaerating section 273 is a deaeration tower equipped with a filler for removing carbon dioxide or is a separation membrane. On the upstream side of the water to be treated of the second deaerating section 273, a pH adjusting section (not shown) that adjusts the water to be treated to a pH at which carbonate ions are present in the form of $CO_2$ may be installed.

The second deaerating section 273 may be installed on the downstream side of the water to be treated of the second upstream side precipitating section 270 and on the upstream side of the second scale inhibitor supplying section 230a.

It is also possible that a deaerating section having the same configuration as the second deaerating section 273 is installed in the flow path between the second demineralizing section 210 and the second crystallizing section 220, in the flow path between the second crystallizing section 220 and the second precipitating section 250, and on the downstream side of the second precipitating section 250 and in the flow path between it and the second demineralizing section 210b or the downstream side demineralizing section 60.

In the case where the concentration of Ca ions in the water to be treated is high, an ion exchanger (not shown) may be installed on the downstream of the filtration device 272 and on the upstream of the second scale inhibitor supplying section 230a located on the most upstream. The ion exchanger may be an ion-exchange resin column or an ion-exchange membrane device, for example.

When gypsum in the water to be treated flowing into the second demineralizing section 210a is already supersaturated, because ions are further concentrated in the second demineralizing section 210a, the resulting gypsum concentration is even higher. In this case, the loading of a large amount of calcium scale inhibitor is required. Further, the concentration of gypsum may become too high for the calcium scale inhibitor to exert its effect, resulting in the production of scales in the second demineralizing section 210a.

Thus, in the case where gypsum in the raw water (water to be treated) is supersaturated, it is possible that an upstream side crystallizing section (not shown) having the same configuration as the second crystallizing sections 220a and 220b is provided on the upstream of the second scale inhibitor supplying section 230a on the most upstream, so that the concentration of gypsum is reduced, and then the water to be treated is fed to the second demineralizing section 210a.

In the first example of this embodiment, a second separating section 280 (280a, 280b) is installed on the downstream side of the second crystallizing section 220 as shown in FIG. 10. The second separating section 280 has the same configuration as the first separating section 180 and includes a classifier 281 (281a, 281b) and a dehydrator 282 (282a, 282b). The classifiers 281a and 281b are liquid cyclones, for example. The dehydrators 282a and 282b are belt filters, for example.

Although the second separating section 280 has only one classifier installed in FIG. 10, it is also possible that two or more classifiers are connected in series in the flow direction of the water to be treated.

A process for treating water to be treated using the water treatment system 201 of the first example of the second embodiment will be described hereinafter.

First, the deposition behaviors of gypsum and calcium carbonate in water will be explained. FIG. 2 shows simulation results for the pH dependency of the amount of gypsum deposited. FIG. 3 shows simulation results for the pH dependency of the amount of calcium carbonate deposited. In the figures, the abscissa is pH, and the ordinate is the amount of gypsum or calcium carbonate deposited (mol). Using a simulation software manufactured by OLI, the simulation was performed under the conditions where 0.1 mol/L of each solid component was mixed with water, and $H_2SO_4$ and $Ca(OH)_2$ were added as an acid and an alkali, respectively.

From FIG. 2, it can be understood that gypsum deposition has no pH dependency, and deposition is possible over the entire pH range. However, when a calcium scale inhibitor is added, in a high-pH region, gypsum is present in the state of being dissolved in water. From FIG. 3, calcium carbonate is deposited when the pH is more than 5.

<Pretreatment>

In the case where the water to be treated is industrial waste water, etc., before the water to be treated flows into the second upstream side precipitating section 270, a step of removing oils, floating particles, and the like from the water to be treated and a step of removing organic substances by a biological treatment or a chemical oxidation treatment are performed.

<Second Deaerating Step>

In the water treatment system 201 of FIG. 10, the water to be treated before flowing into the second deaerating section 273 is adjusted to a low pH. Carbonic acid in the water to be treated is in the following equilibrium depending on the pH of the water to be treated.

[Chemical Formula 2]

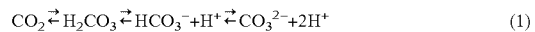

$$CO_2 \rightleftarrows H_2CO_3 \rightleftarrows HCO_3^- + H^+ \rightleftarrows CO_3^{2-} + 2H^+ \qquad (1)$$

In the case where the pH is as low as 6.5 or less, it is mainly present as $HCO_3^-$ and $CO_2$ in the water to be treated.

The water to be treated containing $CO_2$ flows into the second deaerating section 273. $CO_2$ is removed from the water to be treated in the second deaerating section 273. When the water to be treated has been previously adjusted to a pH at which carbonate ions are present as $CO_2$, carbon dioxide can be efficiently removed.

The water to be treated, whose carbonate ion concentration has been reduced in the second deaerating step, is fed to the second upstream side precipitating section 270.

<Second Upstream Side Precipitating Step>

In the second upstream side precipitating section 270, Ca ions and carbonate ions are previously roughly removed from the water to be treated as calcium carbonate. In the case where metal ions other than Ca ions are contained in the water to be treated, in the second upstream side precipitating section 270, the metal ions are previously roughly removed from the water to be treated as a metal compound having low solubility in water. This metal compound is mainly a metal hydroxide, but may also include a carbonate.

In the precipitating tank 271, $Ca(OH)_2$ and an anionic polymer (manufactured by Mitsubishi Heavy Industries Mechatronics Systems, Ltd., trade name: Hishifloc H305) are loaded to the water to be treated, and the pH in the precipitating tank 271 is controlled to 4 or more and 12 or less, and preferably 8.5 or more and 12 or less.

As shown in FIG. 3, the solubility of calcium carbonate is low in this pH range. When calcium carbonate is supersaturated, calcium carbonate is deposited and precipitated at the bottom of the precipitating tank 271.

The solubility of a metal compound depends on pH. A more acidic pH leads to a higher solubility of metal ions in water. For many metal compounds, the solubility is low in the above pH range. In the above pH range, a metal compound having low solubility in water aggregates in the precipitating tank 271, resulting in precipitation at the bottom of the precipitating tank 271.

The precipitated calcium carbonate and metal compound are discharged from the bottom of the precipitating tank 271.

Mg ions form salts that are poorly soluble in water, and thus are components that tend to be deposited as scales. $Mg(OH)_2$ is deposited at pH 10 or more.

In the case where the water to be treated containing Mg ions is treated by the water treatment system 201 of the first example of this embodiment, the pH of the water to be treated is adjusted to a pH at which a magnesium compound (mainly magnesium hydroxide) is deposited in the second upstream side precipitating section 270. Specifically, the pH of the water to be treated is adjusted to 10 or more, preferably 10.5 or more, and more preferably 11 or more. Accordingly, a magnesium compound is deposited from the water to be treated, precipitated at the bottom of the precipitating tank 271, and removed. As a result, Mg ions in the water to be treated are roughly removed, resulting in a decrease in the concentration of Mg ions in the water to be treated.

In the above case, it is preferable that the water to be treated after being discharged from the second upstream side precipitating section 270 is adjusted to a pH at which the above magnesium compound is soluble. Specifically, the pH is adjusted to less than 10. Accordingly, the formation of scales in devices and steps on the downstream side, particularly the second demineralizing section 210 and the second demineralizing step, can be inhibited.

In the case where two or more stages of precipitating tanks 271 are provided, Mg ions in the water to be treated can be reliably removed, and the concentration of Mg ions in the water to be treated fed to the downstream side can be reduced.

The supernatant in the precipitating tank 271, which is the water to be treated, is discharged from the precipitating tank 271. $FeCl_3$ is added to the discharged water to be treated, and solids in the supernatant, such as calcium carbonate and a metal compound, aggregate with $Fe(OH)_3$.

The water to be treated is fed to the filtration device 272. The solids aggregated with $Fe(OH)_3$ are removed through the filtration device 272.

In the case where the second deaerating step is performed after the second upstream side precipitating step, the pH of the water to be treated is adjusted to a pH at which carbonate ions can be present as $CO_2$, specifically 6.5 or less.

Depending on the properties of the water to be treated, the second deaerating step and the second upstream side precipitating step may be omitted.

In the water treatment system 201 of the first example of the second embodiment, in the case where an ion-exchange membrane device is installed, Ca ions in the water to be treated are removed by the ion exchanger. In the case where Mg ions are contained in the water to be treated, the Mg ions are also removed by the ion exchanger.

In the case where gypsum in the raw water is supersaturated, seed crystals of gypsum are loaded to the water to be treated in the upstream side crystallizing section installed immediately after the filtration device 272, and gypsum is crystallized, thereby reducing the concentration of gypsum in the water to be treated. The water to be treated having a reduced concentration of gypsum is fed to the second demineralizing section 210*a*.

<Second Scale Inhibitor Supplying Step>

The control section 232*a* of the second scale inhibitor supplying section 230*a* opens the valve V4*a* and supplies a predetermined amount of calcium scale inhibitor to the water to be treated from the tank 231*a*. The control section 232*a* adjusts the opening of the valve V4*a* so that the concentration of the calcium scale inhibitor is a predetermined value set according to the properties of the water to be treated.

In the case where Mg ions are contained in the water to be treated, a magnesium scale inhibitor is supplied to the water to be treated in the second scale inhibitor supplying step in the same manner as above. In this case, the calcium scale inhibitor and the magnesium scale inhibitor are stored in the tank of each of two or more second scale inhibitor supplying sections, and each control section adjusts the amounts of calcium scale inhibitor and magnesium scale inhibitor to be supplied.

In the water treatment system 201 of the first example of the second embodiment, the pH adjustment of the water to be treated immediately before flowing into the second demineralizing section 210 is optionally performed.

For example, in the configuration of FIG. 10, as a result of the addition of $FeCl_3$, the water to be treated is adjusted to about pH 5 or 6 and then flows into the second demineralizing section 210*a*. As shown in FIG. 3, the solubility of calcium carbonate in water is high when the pH of the water to be treated is 6.5 or less. In addition, as in formula (1), in the above pH range, carbonic acid is present mainly in the form of $HCO_3^-$ and $CO_2$ in water. The water to be treated flowing into the second demineralizing section 210*a* has a reduced concentration of calcium carbonate. In such a case, it is not necessary to adjust the pH immediately before the second demineralizing section 210*a*.

Incidentally, in the case where the pH of the water to be treated, which is to be treated in the second demineralizing step, is adjusted, it is possible that a pH adjusting section having the same configuration as the second pH adjusting section is installed on the upstream of the second demineralizing section 210*a*, and the pH-adjusted water to be treated is fed to the second demineralizing section 210*a*.

<Second Demineralizing Step>

In the second demineralizing section 210*a*, the water to be treated containing the scale inhibitors is treated. In the case where the second demineralizing section 210*a* is a reverse osmosis membrane device, the water that has passed through the reverse osmotic membrane is recovered as treated water. Ions and scale inhibitors contained in the water to be treated cannot pass through the reverse osmosis membrane. Therefore, on the non-permeate side of the reverse osmosis membrane, there is concentrated water having a high concentration of ions (second concentrated water).

Even in the case where gypsum and calcium carbonate in the second concentrated water are concentrated to the saturation concentration or higher as a result of the treatment in the second demineralizing section 210*a*, the production of scales is suppressed by the calcium scale inhibitor.

In the case where Mg ions are contained in the water to be treated, the concentration of Mg ions contained in the second concentrated water increases as a result of the second demineralizing step. However, the production of scales containing magnesium is suppressed by the magnesium scale inhibitor.

Also in the case where other demineralizers, such as a capacitive de-ionization device, are used, for example, the water to be treated is separated into treated water and concentrated water having a high concentration of ions (second concentrated water). The second concentrated water is fed toward the second crystallizing section 220*a*.

<Second pH Adjusting Step>

In the first example of this embodiment, the pH of the water to be treated (second concentrated water) may be adjusted by the second pH adjusting section 240a between the second demineralizing section 210a and the second crystallizing section 220a.

The second pH adjusting section 240a controls the pH of the second concentrated water to such a value that the function of the calcium scale inhibitor is reduced and gypsum in the second concentrated water can be deposited. The pH meter 243a measures the pH of the second concentrated water. The control section 242a adjusts the opening of the valve V6a so that the value measured by the pH meter 243a is a predetermined pH control value.

<Second Crystallizing Step>

The second concentrated water discharged from the second demineralizing section 210a is stored in the second crystallizing tank 221a of the second crystallizing section 220a. The control section 224a of the second seed crystal supplying section 222a opens the valve V5a and adds seed crystals of gypsum from the seed crystal tank 223a to the second concentrated water in the second crystallizing tank 221a.

The pH of the second concentrated water from the second demineralizing section 210a is 10 or more. As mentioned above, gypsum is in the state of being dissolved in water in a high-pH region where a calcium scale inhibitor is present. However, when seed crystals are sufficiently present, even when a scale inhibitor is present, gypsum is crystallized using the seed crystals as nuclei. In the water treatment system 201 of FIG. 10, the crystal-grown gypsum having a large diameter (e.g., having a particle diameter of 10 m or more, more preferably 20 μm or more) is precipitated at the bottom of the second crystallizing tank 221a. The precipitated gypsum is discharged from the bottom of the second crystallizing tank 221a.

With reference to FIG. 3, calcium carbonate tends to be deposited at pH 10 or more. However, because the calcium scale inhibitor has been added, the deposition of calcium carbonate is suppressed in the second crystallizing tank 221a. In addition, in the case where the second upstream side precipitating section or the second deaerating section is provided, the concentration of calcium carbonate has been previously reduced. As a result, in the second crystallizing tank 221a, calcium carbonate is unlikely to be crystallized using the seed crystals of gypsum as nuclei.

Incidentally, although gypsum is crystallized independent of pH when seed crystals of gypsum are present, the crystallization rate increases with a decrease in pH.

FIG. 5 shows the result of gypsum deposition experiments with changing the pH of simulated water in the case where a scale inhibitor (FLOCON260) is added to simulated water (containing $Ca^{2+}$, $SO_4^{2+}$, $Na^+$, and $Cl^-$) in which gypsum is supersaturated. The experimental conditions are as follows:

The degree of gypsum supersaturation in simulated water (25° C.): 460%,

The amount of scale inhibitor to be added: 2.1 mg/L, pH: 6.5 (Condition 1), 5.5 (Condition 2), 4.0 (Condition 3), 3.0 (Condition 4), The amount of seed crystals to be added: 0 g/L.

Two hours and 6 hours immediately after the pH adjustment, the concentration of Ca in the simulated water treated under each condition was measured using an atomic absorption spectrometer (manufactured by Shimadzu Corporation, AA-7000), and the degree of supersaturation was calculated. The results are shown in FIG. 5. In the figure, the ordinate is the degree of supersaturation (%).

With reference to FIG. 5, even under conditions where seed crystals are absent, the crystallization rate increases with a decrease in pH. From this, it can be understood that in the case where seed crystals are present, gypsum is crystallized even under Condition 1 (pH 6.5), and the relation of the crystallization rate is such that the crystallization rate increases with a decrease in pH as shown in FIG. 5.

In the case where carbonate ions are contained in the water to be treated, under low-pH conditions, carbonate ions are removed from the water to be treated as $CO_2$ as in chemical formula (1). In addition, as can be understood from FIG. 3, in the case where the pH is low, calcium carbonate is in a dissolved state.

From these results, when the second crystallizing step is performed under low-pH conditions, because of the low content of calcium carbonate, high-purity gypsum is crystallized and recovered from the bottom of the second crystallizing tank 221a. In the case where the second crystallizing step is performed at low pH, a third pH adjusting section (not shown) that supplies an acid as a pH adjuster is installed in the second crystallizing tank 221a or in the flow path between the second demineralizing section 210a and the second crystallizing tank 221a. The pH adjusting section has the same configuration as the second pH adjusting section.

Meanwhile, in order to change the pH in the course of water treatment, it is necessary to supply a large amount of chemicals (acid or alkali). The use of an acid or an alkali leads to an increase in the amount of ions transferred to the downstream side of the second crystallizing section 220a, and this causes an increase in the power of demineralizing sections on the downstream side (in FIG. 10, the second demineralizing section 210b or the downstream side demineralizing section 60). In terms of operation cost, it is more advantageous that the pH is not changed between the second demineralizing step and the second crystallizing step.

The gypsum crystallization rate depends on the loading of seed crystals.

FIG. 6 shows the results of gypsum deposition experiments with changing the amount of seed crystals to be added in the case where a calcium scale inhibitor (FLOCON260) is added to simulated water. The experimental conditions were the same as in FIG. 5, except that the pH was 4.0, and that gypsum ($CaSO_4.2H_2O$) was added as seed crystals in the following amounts:

The amount of seed crystals to be added: 0 g/L (Condition 3), 3 g/L (Condition 5), 6 g/L (Condition 6), 3 g/L (Condition 7).

Under Conditions 5 and 6, seed crystals and sulfuric acid for pH adjustment were added to the simulated water having added thereto a scale inhibitor. Under Condition 7, seed crystals pre-immersed in the above scale inhibitor were added to the simulated water having added thereto a scale inhibitor, and sulfuric acid was added for pH adjustment.

Two hours immediately after the pH adjustment, the concentration of Ca in the simulated water treated under each condition was measured by the same technique as in FIG. 5. In FIG. 6, the ordinate is the degree of supersaturation (%).

From the results of FIG. 6, it can be understood that although the degree of supersaturation was 215% under Condition 3 where seed crystals are not added, the degree of supersaturation decreases to 199% (Condition 5) and 176% (Condition 6) with an increase in the concentration of seed crystals, leading to an increase in the gypsum deposition rate. Also under high-pH conditions, similarly, the gypsum deposition rate tends to increase with an increase in the loading of seed crystals.

Condition 5 and Condition 7 are the same test conditions, except for whether the used seed crystals are not immersed or immersed in a scale inhibitor. Also under Condition 7 where seed crystals have a scale inhibitor previously adhering thereto, the degree of supersaturation is 199%, and it has been confirmed that gypsum is deposited at the same level as under Condition 5. That is, the results under Condition 5 and 7 show that independent of the immersion time of seed crystals in a calcium scale inhibitor, when the pH is reduced to 4.0, the function of the scale inhibitor is reduced.

FIGS. 7 and 8 each show a microphotograph of gypsum resulting from crystallization. FIG. 7 shows results under Condition 5 (seed crystals added), and FIG. 8 shows results under Condition 3 (no seed crystals added). Under Condition 5, gypsum having a larger size was deposited than under Condition 3. Generally, the water content decreases with an increase in the size of deposited gypsum. A low water content leads to high-purity gypsum. When the average particle diameter is 10 μm or more, preferably 20 μm or more, the resulting gypsum has a sufficiently reduced water content. The "average particle diameter" in the present invention is a particle diameter measured by the method specified in JIS Z 8825 (laser diffractometry).

In FIG. 6, as a comparison with Condition 5 (pH 4.0), under Condition 7 (pH 4.0), seed crystals pre-immersed in the above calcium scale inhibitor were added to simulated water having added thereto a calcium scale inhibitor, and sulfuric acid was added for pH adjustment. Condition 5 and Condition 7 are otherwise the same, and gypsum deposition experiments were performed under such conditions. Two hours after the pH adjustment, the concentration of Ca in the simulated water was measured by the same technique as in FIG. 3.

As a result, as shown in FIG. 6, the degree of supersaturation was 199% or less both under Condition 5 and Condition 7. From this, it can be said that independent of the immersion time of seed crystals in a calcium scale inhibitor, when the pH is reduced to 4.0, the function of the calcium scale inhibitor is reduced.

In consideration of the effects of the calcium scale inhibitor, the pH of the second concentrated water is adjusted in the second pH adjusting step to 6.0 or less, preferably 5.5 or less, and more preferably 4.0 or less. In particular, when the second concentrated water is adjusted to pH 4.0 or less, the function of the calcium scale inhibitor can be significantly reduced. By adjusting the pH of the second concentrated water to such a value that the scale inhibition function of the calcium scale inhibitor is reduced, crystallization in the second crystallizing section 220a is promoted. According to the kind of scale inhibitor, the pH range in the second pH adjusting step is suitably determined.

With reference to FIG. 3, calcium carbonate dissolves in water at pH 6.0 or less.

From the above, high-purity gypsum can be recovered in the second crystallizing tank 221a of the second water treatment section.

<Second Separating Step>

The second concentrated water in the second crystallizing tanks 221a and 221b is transferred to the second separating sections 280a and 280b. The second concentrated water transferred here is water containing solid matters deposited in the second crystallizing tanks 221a and 221b.

The second concentrated water discharged from the second crystallizing tanks 221a and 221b contains gypsum having various particle diameters deposited by crystallization, as well as calcium carbonate deposited due to the exceeding of the saturation concentration. Because the deposition of calcium carbonate has taken place in the absence of seed crystals, they have small diameters or are floating matters in a colloidal form.

When the second concentrated water flows into the classifiers 281a and 281b, gypsum having a predetermined size, for example, gypsum having an average particle diameter of 10 μm or more, sediments at the bottom of the classifiers 281a and 281b, and gypsum having a small particle diameter, calcium carbonate, and silica remain in the supernatant. The gypsum sedimented at the bottom of the classifiers 281a and 281b is further dehydrated by the dehydrators 282a and 282b and recovered. The supernatant containing gypsum having a small particle diameter, calcium carbonate, and silica is fed to the second precipitating sections 250a and 250b.

In the first example of this embodiment, seed crystals are added to cause crystallization. Therefore, gypsum having an average particle diameter of 10 μm or more is mainly deposited, and the proportion of gypsum having a small diameter is low. Through the second separating step, gypsum having a low water content and containing no impurities (i.e., high-purity gypsum) can be separated and recovered with high recovery.

Some of the gypsum recovered in the second separating sections 280a and 280b may be circulated through the seed crystal tanks 223a and 223b as seed crystals.

In the case where the second separating section 280a is not installed, gypsum precipitated at the bottom of the second crystallizing tank 221a of the second crystallizing section 220a is discharged from the second crystallizing tank 221a. The supernatant in the second crystallizing tank 221a is fed to the second precipitating section 250a.

<Second Precipitating Step>

The supernatant (second concentrated water) in the second crystallizing section 220a or the supernatant (second concentrated water) discharged from the second separating section 280a is fed to the second precipitating section 250a.

In the second precipitating section 250a, $Ca(OH)_2$ and an anionic polymer (Hishifloc H305) are loaded to the second concentrated water after the crystallizing step, and the pH in the second precipitating tank 251a is controlled to 4 or more and 12 or less, and preferably 8.5 or more and 12 or less. In the second precipitating tank 251a, calcium carbonate and a metal compound are precipitated and removed from the second concentrated water. The precipitated calcium carbonate and metal compound having low solubility in water are discharged from the bottom of the second precipitating tank 251a.

The water to be treated, which is the supernatant in the second precipitating tank 251a, is discharged from the second precipitating tank 251a. $FeCl_3$ is added to the discharged water to be treated, and solids in the water to be treated, such as calcium carbonate and a metal compound, aggregate with $Fe(OH)_3$.

The water to be treated is fed to the second filtration device 252a. The solids aggregated with $Fe(OH)_3$ are removed through the second filtration device 252a.

In the case where the treatment is performed in several stages as shown in FIG. 10, the second concentrated water that has passed through the second filtration device 252a of the second water treatment section of the previous stage flows into the water treatment section of the subsequent stage as water to be treated. In the water treatment section of the subsequent stage, the steps from the second scale inhibitor supplying step to the second precipitating step mentioned above are performed.

<Downstream Side Demineralizing Step>

The second concentrated water that has passed through the second precipitating section 250b located on the most downstream of the water to be treated is treated in the downstream side demineralizing section 60. The water that has passed through the downstream side demineralizing section 60 is recovered as treated water. The concentrated water in the downstream side demineralizing section 60 is discharged out of the system. The installation of the downstream side demineralizing section 60 makes it possible to further recover treated water from water that has been treated in a water treatment section. Accordingly, the water recovery is improved.

Also in the first example of this embodiment, an evaporator (not shown) may be installed on the downstream on the concentrated-water side of the downstream side demineralizing section 60.

In the first example of the second embodiment, in the case where the second concentrated water is adjusted in the second pH adjusting step to a pH at which the function of the calcium scale inhibitor is reduced, as a third pH adjusting step, the pH of the second concentrated water may be adjusted after the second crystallizing step in order for the calcium scale inhibitor to exert its function. Specifically, the pH is preferably adjusted to 4.0 or more, preferably 5.5 or more, and more preferably 6.0 or more. The third pH adjusting step is performed after the second crystallizing step and before the second demineralizing step, or after the second crystallizing step and before the downstream side demineralizing step.

In the water treatment system 201 of the first example this embodiment, ions are concentrated in the second demineralizing section 210a. However, gypsum, calcium carbonate, etc., have been removed in the second crystallizing section 220a, the second precipitating section 250a, etc. Accordingly, the water flowing into the second demineralizing section 210b or the downstream side demineralizing section 60 has a smaller number of moles of ions than before the treatment. Accordingly, the osmotic pressure is low in the second demineralizing section 210b or the downstream side demineralizing section 60 located downstream, and the required power is reduced.

In the water treatment system 201 of the first example of this embodiment, in order to perform the third pH adjusting step, a third pH adjusting section (not shown in FIG. 10) having the same configuration as the second pH adjusting section is installed between the second crystallizing section and the second demineralizing section immediately thereafter (in FIG. 10, between the second crystallizing section 220a and the second demineralizing sections 210b, particularly the second precipitating section 250a and the second demineralizing section 210b). In addition, a third pH adjusting section (not shown in FIG. 10) having the same configuration as the second pH adjusting section is installed between the second precipitating section 250b and the downstream side demineralizing section 60 on the most downstream. Accordingly, even in the case where the second concentrated water is treated in the downstream side demineralizing step, and the concentration of Ca ions is high on the concentrated-water side, the formation of scales can be suppressed by the function of the calcium scale inhibitor.

By using the water treatment system 201 of the first example of the second embodiment, water to be treated containing ions can be treated with high water recovery.

In particular, in the first example of the second embodiment, gypsum is mainly deposited in the second crystallizing section 220. Accordingly, the gypsum recovery in the second crystallizing section 220 is high, and the number of moles of ions fed to the downstream side is further reduced. In addition, the purity of the gypsum recovered in the second crystallizing section 220 can be increased.

Second Example of Second Embodiment

Figure 11:
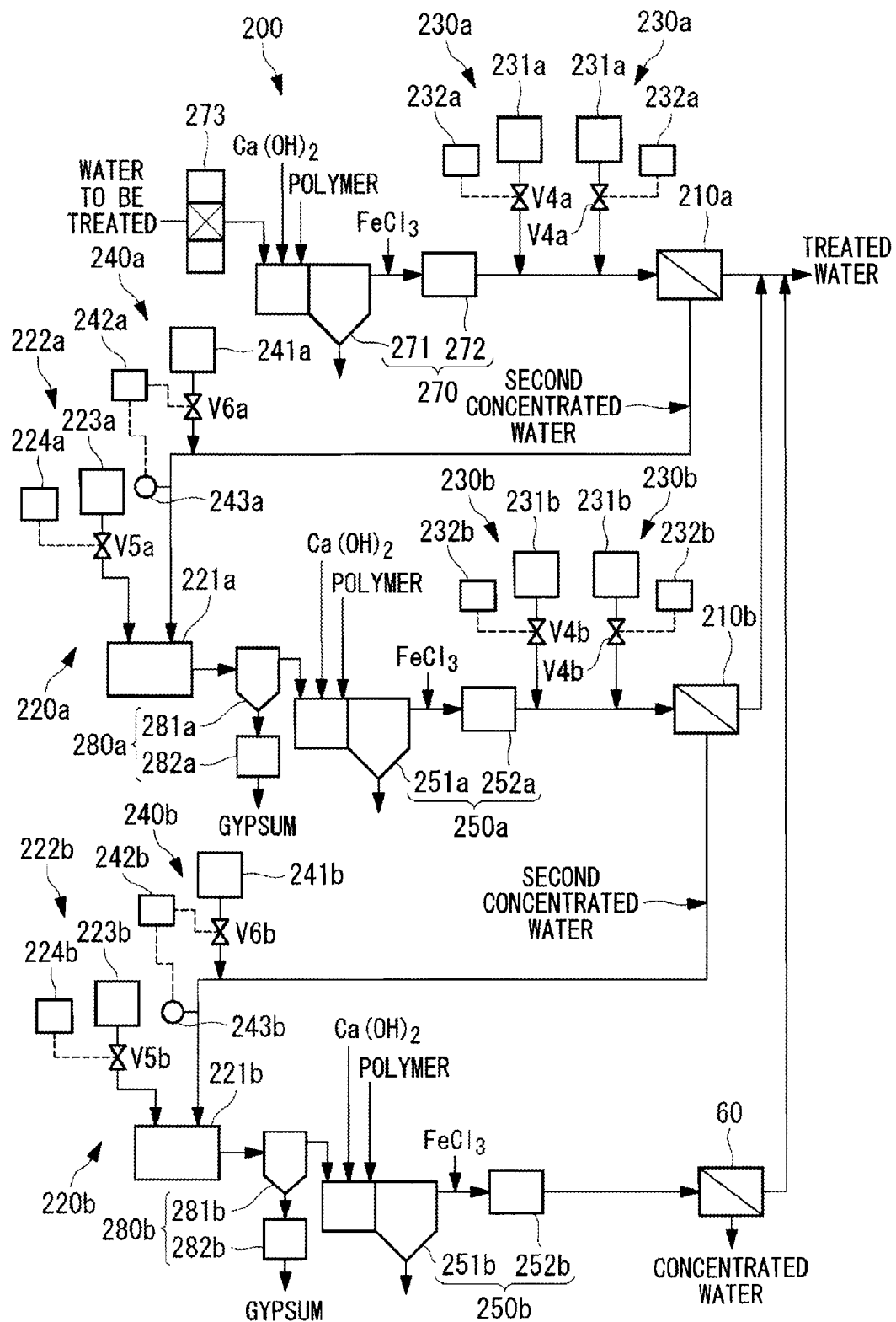
FIG. 11 is a schematic diagram of a water treatment system according to a second example of the second embodiment.

FIG. 11 is a schematic diagram of a water treatment system of the second example of the second embodiment of the present invention. The water treatment system 200 of FIG. 11 is configured such that two water treatment sections are connected in the flow direction of the water to be treated. Depending on the properties of the water to be treated, the number of water treatment sections may be one, and it is also possible that three or more water treatment sections are connected.

In the water treatment system 200 of the second example of the second embodiment, each water treatment section includes, from the upstream side of the water to be treated, a second demineralizing section 210 (210a, 210b) and a second crystallizing section 220 (220a, 220b). The concentration sides of the second demineralizing sections 210a and 210b are connected to the second crystallizing sections 220a and 220b, respectively. The water treatment section includes a second scale inhibitor supplying section 230 (230a, 230b) in the flow path on the upstream side of each second demineralizing section 210 (210a, 210b).

The second scale inhibitor supplying sections 230a and 230b are each made up of a tank 231 (231a, 231b), a valve V4 (V4a, V4b), and a control section 232 (232a, 232b). The control sections 232a and 232b are connected to the valves V4a and V4b, respectively. The tanks 231a and 231b of the second scale inhibitor supplying sections 230a and 230b have stored therein a scale inhibitor.

Scale inhibitors used in the second example of the second embodiment are the calcium scale inhibitor described in the first reference embodiment and a scale inhibitor that inhibits the deposition of silica as scales in the water to be treated (referred to as "silica scale inhibitor"). Examples of silica scale inhibitors include phosphonic-acid-based scale inhibitors, polycarboxylic-acid-based scale inhibitors, and mixtures thereof. A specific example is FLOCON260 (trade name, manufactured by BWA).

FIG. 11 shows two tanks 231a. For example, a calcium scale inhibitor is stored in one tank 231a, and a silica scale inhibitor is stored in the other tank 231a.

In FIG. 11, the second demineralizing section 210 is a reverse osmosis membrane device. In addition, the second demineralizing section 210 may also be an electrodialyzer (ED), an electro dialysis reversal device (EDR), an electro de-ionization device (EDI), an ion-exchange equipment, a capacitive de-ionization device (CDI), a nanofilters (NF), an evaporator, etc.

Although only one second demineralizing section 210 is shown in FIG. 11, the system may also be configured such that two or more demineralizers are connected in parallel or in series in the flow direction of the water to be treated.

The second crystallizing section 220 (220a, 220b) is made up of a second crystallizing tank 221 (221a, 221b) and a second seed crystal supplying section 222 (222a, 222b). The second seed crystal supplying section 222 is connected to the second crystallizing tank 221. The second seed crystal supplying section 222 has a seed crystal tank 223 (223a, 223b), a valve V5 (V5a, V5b), and a control section 224

(224a, 224b). The control section 224 is connected to the valve V5. The seed crystal tank 223 stores gypsum particles as seed crystals.

In the water treatment system 200 of the second example of the second embodiment, a second pH adjusting section 240 (240a, 240b) may be installed between the second demineralizing section 210 and the second crystallizing section 220. The second pH adjusting section 240 is made up of a tank 241 (241a, 241b), a valve V6 (V6a, V6b), a pH meter 243 (243a, 243b), and a control section 242 (242a, 242b). The tank 241 has stored therein an acid as a pH adjuster. The acid used may be hydrochloric acid, sulfuric acid, nitric acid, or the like, for example. Sulfuric acid is particularly preferable because $SO_4^{2-}$ is removed as gypsum in the crystallizing step, and thus the amount of ions that reach the demineralizing section on the downstream side can be reduced. The control section 242 is connected to the valve V6 and the pH meter 243. The pH meter 243 may be installed in the flow path between the second demineralizing section 210 and the second crystallizing section 220 as shown in FIG. 11, or may also be installed in the second crystallizing tank 221.

In the water treatment system 200, a precipitating tank 271 and a filtration device 272 are installed as a second upstream side precipitating section 270 on the upstream side of the second scale inhibitor supplying section 230a located on the most upstream of the water to be treated. The second upstream side precipitating section 270 has the same configuration as the first upstream side precipitating section 70. As in the first reference embodiment, two or more stages of precipitating tanks 271 may be connected in series in the flow direction of the water to be treated.

In the water treatment system 200, a second deaerating section 273 may be provided on the upstream side of the second upstream side precipitating section 270 as shown in FIG. 11. The second deaerating section 273 has the same configuration as the first deaerating section 73 of the first reference embodiment.

The second deaerating section 273 may be installed on the downstream side of the water to be treated of the second upstream side precipitating section 270 and on the upstream side of the second scale inhibitor supplying section 230a.

It is also possible that a deaerating section having the same configuration as the second deaerating section 273 is installed in the flow path between the second demineralizing section 210a and the second crystallizing section 220a, in the flow path between the second crystallizing section 220 and the second precipitating section 250, and on the downstream side of the second precipitating section 250 and in the flow path between it and the second demineralizing section 210b or the downstream side demineralizing section 60.

As in the first reference embodiment, an ion-exchange equipment (not shown) may be installed on the downstream of the filtration device 272 and on the upstream of the second scale inhibitor supplying section 230a located on the most upstream. In addition, depending on the concentration of gypsum in the water to be treated, an upstream side crystallizing section (not shown) having the same configuration as the second crystallizing section may be installed on the upstream of the second scale inhibitor supplying section 230a on the most upstream.

In the second example of this embodiment, a second separating section 280 (280a, 280b) may be installed on the downstream side of the second crystallizing section 220 as shown in FIG. 11. The second separating section 280 has the same configuration as the first separating section 180 and includes a classifier 281 (281a, 281b) and a dehydrator 282 (282a, 282b).

In the water treatment system 200 of FIG. 11, a second precipitating section 250 (250a, 250b) may be installed on the downstream side of the second crystallizing section 220. The second precipitating section 250 has the same configuration as the first precipitating section 50 and includes a second precipitating tank 251 (251a, 251b) and a second filtration device 252 (252a, 252b).

The water treatment system 200 includes a downstream side demineralizing section 60 on the downstream side of the water to be treated of the first water treatment section. An evaporator (not shown in FIG. 11) may be installed on the downstream on the concentrated-water side of the downstream side demineralizing section 60.

A process for treating water to be treated using the water treatment system 200 of the second example of the second embodiment will be described hereinafter.

<Pretreatment>

The water to be treated is subjected to the pretreatment described in the first reference embodiment.

<Second Deaerating Step>

In the same manner as in the first deaerating step described in the first reference embodiment, $CO_2$ in the water to be treated is removed in the second deaerating section 273, whereby the concentration of carbonate ions in the water to be treated is reduced.

<Second Upstream Side Precipitating Step>

In the second upstream side precipitating section 270, some of Ca ions and carbonate ions are previously removed from the water to be treated as calcium carbonate. In the case where metal ions other than Ca ions are contained in the water to be treated, in the second upstream side precipitating section 270, some of a metal compound having low solubility in water is previously removed from the water to be treated.

The second upstream side precipitating step is performed in the same manner as in the first upstream side precipitating step.

In the case where water to be treated containing Mg ions is treated in the water treatment system 200 of the second example of this embodiment, as in the first reference embodiment, the water to be treated is adjusted to a pH at which a magnesium compound is deposited in the second upstream side precipitating section 270, and some of Mg ions in the water to be treated are removed. Subsequently, it is preferable that the water to be treated is adjusted to a pH at which the magnesium compound is soluble on the downstream side of the second upstream side precipitating section 270. Specifically, the pH is adjusted to less than 10. Accordingly, the formation of scales in devices and steps on the downstream side, particularly the second demineralizing section 210 and the second demineralizing step, can be inhibited.

In the case where the second deaerating step is performed after the second upstream side precipitating step, the pH of the water to be treated is adjusted to a pH at which carbonate ions can be present as $CO_2$, specifically 6.5 or less.

Depending on the properties of the water to be treated, the second deaerating step and the second upstream side precipitating step may be omitted.

In the case where an ion-exchange membrane device is installed, in the water treatment system 200 of the second example of the second embodiment, Ca ions and Mg ions in the water to be treated are removed by the ion-exchange membrane device.

In the case where an upstream side crystallizing section is installed, the concentration of gypsum in the water to be treated is reduced in the upstream side crystallizing section through the same steps as in the first reference embodiment.

<Second Scale Inhibitor Supplying Step>

The control section 232a of the second scale inhibitor supplying section 230a opens the valve V4a and supplies a predetermined amount of calcium scale inhibitor to the water to be treated from the tank 231a. The control section 232b of the second scale inhibitor supplying section 230b opens the valve V4b and supplies a predetermined amount of silica scale inhibitor to the water to be treated from the tank 231b. The control section 232a and the control section 232b adjust the valve opening of the valve V4a and the valve V4b, respectively, so that the concentrations of the calcium scale inhibitor and the silica scale inhibitor are predetermined values set according to the properties of the water to be treated.

In the water treatment system 200 of the second example of the second embodiment, the pH adjustment of the water to be treated immediately before flowing into the second demineralizing section 210 is optionally performed.

For example, in the configuration of FIG. 11, as a result of the addition of $FeCl_3$, the water to be treated is adjusted to about pH 5 to 6 and then flows into the second demineralizing section 210a. As shown in FIG. 3, the solubility of calcium carbonate in water is high when the pH of the water to be treated is 6.5 or less. In addition, as in formula (1), in the above pH range, carbonic acid is present mainly in the form of $HCO_3^-$ and $CO_2$ in water. The water to be treated flowing into the second demineralizing section 210a has a reduced concentration of calcium carbonate. In such a case, it is not necessary to adjust the pH immediately before the second demineralizing section 210a.

Incidentally, in the case where the pH of the water to be treated, which is to be treated in the second demineralizing step, is adjusted, it is possible that a pH adjusting section having the same configuration as the first pH adjusting section of the first reference embodiment is installed on the upstream of the second demineralizing section 210a, and the pH-adjusted water to be treated is fed to the second demineralizing section 210a.

<Second Demineralizing Step>

In the second demineralizing section 210a, the water to be treated containing the scale inhibitors is treated. In the case where the second demineralizing section 210a is a reverse osmosis membrane device, the water that has passed through the reverse osmotic membrane is recovered as treated water. The water containing ions and the scale inhibitors is discharged from the non-permeate side of the reverse osmosis membrane as concentrated water (second concentrated water).

As a result of the treatment in the second demineralizing section 210a, gypsum and silica is concentrated in the second concentrated water. However, the production of scales is suppressed by the calcium scale inhibitor and the silica scale inhibitor.

Also in the case where other demineralizers, such as a capacitive de-ionization device, are used, for example, the water to be treated is separated into treated water and concentrated water having a high concentration of ions (second concentrated water). The second concentrated water is fed toward the second crystallizing section 220a.

<Second pH Adjusting Step>

In the second example of this embodiment, the pH of the water to be treated (second concentrated water) may be adjusted by the second pH adjusting section 240a between the second demineralizing section 210a and the second crystallizing section 220a.

The second pH adjusting section 240a controls the pH of the second concentrated water to such a value that the function of the calcium scale inhibitor is reduced and gypsum in the second concentrated water can be deposited. The pH meter 243a measures the pH of the second concentrated water. The control section 242a adjusts the opening of the valve V6a so that the value measured by the pH meter 243a is a predetermined pH control value.

<Second Crystallizing Step>

The second concentrated water is stored in the second crystallizing tank 221 of the second crystallizing section 220a. The control section 224a of the second seed crystal supplying section 222a opens the valve V5 and adds seed crystals of gypsum from the seed crystal tank 223a to the second concentrated water in the second crystallizing tank 221a. Although the second concentrated water contains a calcium scale inhibitor, when seed crystals are loaded, gypsum is crystallized, followed by crystal growth.

As shown in FIG. 5, under Condition 1 (pH 6.5), the degree of supersaturation is 460%, and there is no change from the initial degree of supersaturation even after the elapse of 6 hours. Under Condition 1, the scale inhibitor exerts its function to suppress the deposition of gypsum. Meanwhile, under Condition 4 and Condition 2, the degree of supersaturation decreases.

That is, it has been confirmed that even when seed crystals are not loaded, a decrease in pH leads to a decrease in the function of the scale inhibitor, whereby gypsum is crystallized. In addition, according to the results of FIG. 5, the deposition rate increases with a decrease in pH.

In FIG. 6, as a comparison with Condition 5 (pH 4.0), under Condition 7 (pH 4.0), seed crystals pre-immersed in the above calcium scale inhibitor were added to simulated water having added thereto a calcium scale inhibitor, and sulfuric acid was added for pH adjustment. Condition 5 and Condition 7 are otherwise the same, and gypsum deposition experiments were performed under such conditions. Two hours after the pH adjustment, the concentration of Ca in the simulated water was measured by the same technique as in FIG. 3.

As a result, as shown in FIG. 6, the degree of supersaturation was 199% or less both under Condition 5 and Condition 7. From this, it can be said that independent of the immersion time of seed crystals in a calcium scale inhibitor, when the pH is reduced to 4.0, the function of the calcium scale inhibitor is reduced.

In consideration of the effects of the calcium scale inhibitor, the pH of the second concentrated water is adjusted in the second pH adjusting step to 6.0 or less, preferably 5.5 or less, and more preferably 4.0 or less. In particular, when the second concentrated water is adjusted to pH 4.0 or less, the function of the calcium scale inhibitor can be significantly reduced. By adjusting the pH of the second concentrated water to such a value that the scale inhibition function of the calcium scale inhibitor is reduced, crystallization in the second crystallizing section 220a is promoted. According to the kind of scale inhibitor, the pH range in the second pH adjusting step is suitably determined.

With reference to FIG. 4, in the case where pH is low, silica may exceed the saturation solubility. However, in the second example of this embodiment, a silica scale inhibitor is loaded in the second water treatment section. Accordingly, the deposition of silica is suppressed even at low pH. Even when silica is deposited in the second crystallizing tank

221a, such silica is present as small-diameter particles or floating matters in a colloidal form.

In addition, with reference to FIG. 3, calcium carbonate dissolves in water at pH 6.0 or less.

From the above, high-purity gypsum can be recovered in the second crystallizing tank 221a of the second water treatment section.

Meanwhile, the second concentrated water in the second crystallizing step may also be adjusted in the second pH adjusting step to a pH at which silica is soluble in the second concentrated water. Accordingly, in the second crystallizing tank 221a, the deposition of silica from the second concentrated water is suppressed. As a result, in the case where the second concentrated water discharged from the second crystallizing tank 221a in the second separating section 280a is classified, the purity of the recovered gypsum can be increased.

<Second Separating Step>

In the case where the second separating section 280a is installed, the second concentrated water containing solid matters deposited in the second crystallizing tank 221a is transferred to the second separating section 280a. In the second concentrated water in the second crystallizing tank 221a, gypsum deposited by crystallization is present. In addition, the second concentrated water may also contain silica deposited because of an increase in the silica concentration to be equal to or higher than the concentration at which the silica scale inhibitor exerts its function due to the quality change or concentration of the raw water. Silica is present in the second concentrated water as small-diameter particles or floating matters in a colloidal form.

Through the same steps as in the first embodiment, the classifier 281a of the second separating section 280a performs separation into gypsum having a predetermined size (e.g., having an average particle diameter of 10 μm or more) and a supernatant containing small-diameter precipitates (gypsum, silica). Large-diameter gypsum is further dehydrated by the dehydrator 282a and recovered. According to the second example of this embodiment, high-purity gypsum can be recovered. Some of the recovered gypsum may be circulated through the seed crystal tank 223a as seed crystals.

In the case where the second separating section 280a is not installed, gypsum precipitated at the bottom of the second crystallizing tank 221a of the second crystallizing section 220a is discharged from the second crystallizing tank 221a. The supernatant in the second crystallizing tank 221a is fed to the second precipitating section 250a.

<Second Precipitating Step>

The supernatant (second concentrated water) in the second crystallizing section 220a or the supernatant (second concentrated water) discharged from the second separating section 280a is fed to the second precipitating section 250a.

In the second precipitating step, in the same manner as in the first precipitating step described in the first reference embodiment, calcium carbonate and metal compounds in the second concentrated water are removed in the second precipitating tank 251a and the second filtration device 252a.

In the second precipitating step, it is also possible that in the same manner as in the first precipitating step, at least one of seed crystals of silica and a precipitant for silica is added to the second precipitating tank 251a to remove silica from the second concentrated water.

In the case where the treatment is performed in several stages as shown in FIG. 11, the second concentrated water that has passed through the second filtration device 252a of the second water treatment section of the previous stage flows into the water treatment section of the subsequent stage as water to be treated. In the water treatment section of the subsequent stage, the steps from the second scale inhibitor supplying step to the second precipitating step mentioned above are performed.

<Downstream Side Demineralizing Step>

The second concentrated water that has passed through the second precipitating section 250b located on the most downstream of the water to be treated is treated in the downstream side demineralizing section 60. The water that has passed through the downstream side demineralizing section 60 is recovered as water to be treated. The concentrated water in the downstream side demineralizing section 60 is discharged out of the system.

Also in the second example of this embodiment, an evaporator (not shown) may be installed on the downstream on the concentrated-water side of the downstream side demineralizing section 60.

In the second example of the second embodiment, in the case where the second concentrated water is adjusted in the second pH adjusting step to a pH at which the function of the calcium scale inhibitor is reduced, as a third pH adjusting step, the pH of the second concentrated water may be adjusted after the second crystallizing step in order for the calcium scale inhibitor to exert its function. Specifically, the pH is preferably adjusted to 4.0 or more, preferably 5.5 or more, and more preferably 6.0 or more. The third pH adjusting step is performed after the second crystallizing step and before the second demineralizing step, or after the second crystallizing step and before the downstream side demineralizing step.

In the water treatment system 200 of the second example of this embodiment, in order to perform the third pH adjusting step, a third pH adjusting section (not shown in FIG. 10) having the same configuration as the second pH adjusting section is installed between the second crystallizing section and the second demineralizing section immediately thereafter (in FIG. 10, between the second crystallizing section 220a and the second demineralizing sections 210b, particularly the second precipitating section 250a and the second demineralizing section 210b). In addition, a third pH adjusting section (not shown in FIG. 10) having the same configuration as the second pH adjusting section is installed between the second precipitating section 250b and the downstream side demineralizing section 60 on the most downstream. Accordingly, even in the case where the second concentrated water is treated in the downstream side demineralizing step, and the concentration of Ca ions is high on the concentrated-water side, the formation of scales can be suppressed by the function of the calcium scale inhibitor.

In the water treatment system 200 of the second example of this embodiment, silica is concentrated by the treatment in the second water treatment section. When the concentration of silica in the second concentrated water is equal to or higher than the concentration at which the silica scale inhibitor effectively works, scales of silica may be formed from the second concentrated water. For example, in the case where FLOCON260 is used as a silica scale inhibitor, the scale-production-inhibiting effect can be obtained at a silica concentration up to about 200 mg/L. Therefore, the number of stages of the second water treatment sections is determined so that silica is concentrated to the concentration at which the silica scale inhibitor can exert its effect.

By using the water treatment system 200 of the second example of the second embodiment, water to be treated containing ions can be treated with high water recovery.

In particular, in the second example of the second embodiment, gypsum is mainly deposited in the second crystallizing section 220. Accordingly, the gypsum recovery in the second crystallizing section 220 is high, and the number of moles of ions fed to the downstream side is further reduced. In addition, the purity of the gypsum recovered in the second crystallizing section 220 can be increased.

Third Embodiment

Figure 12:
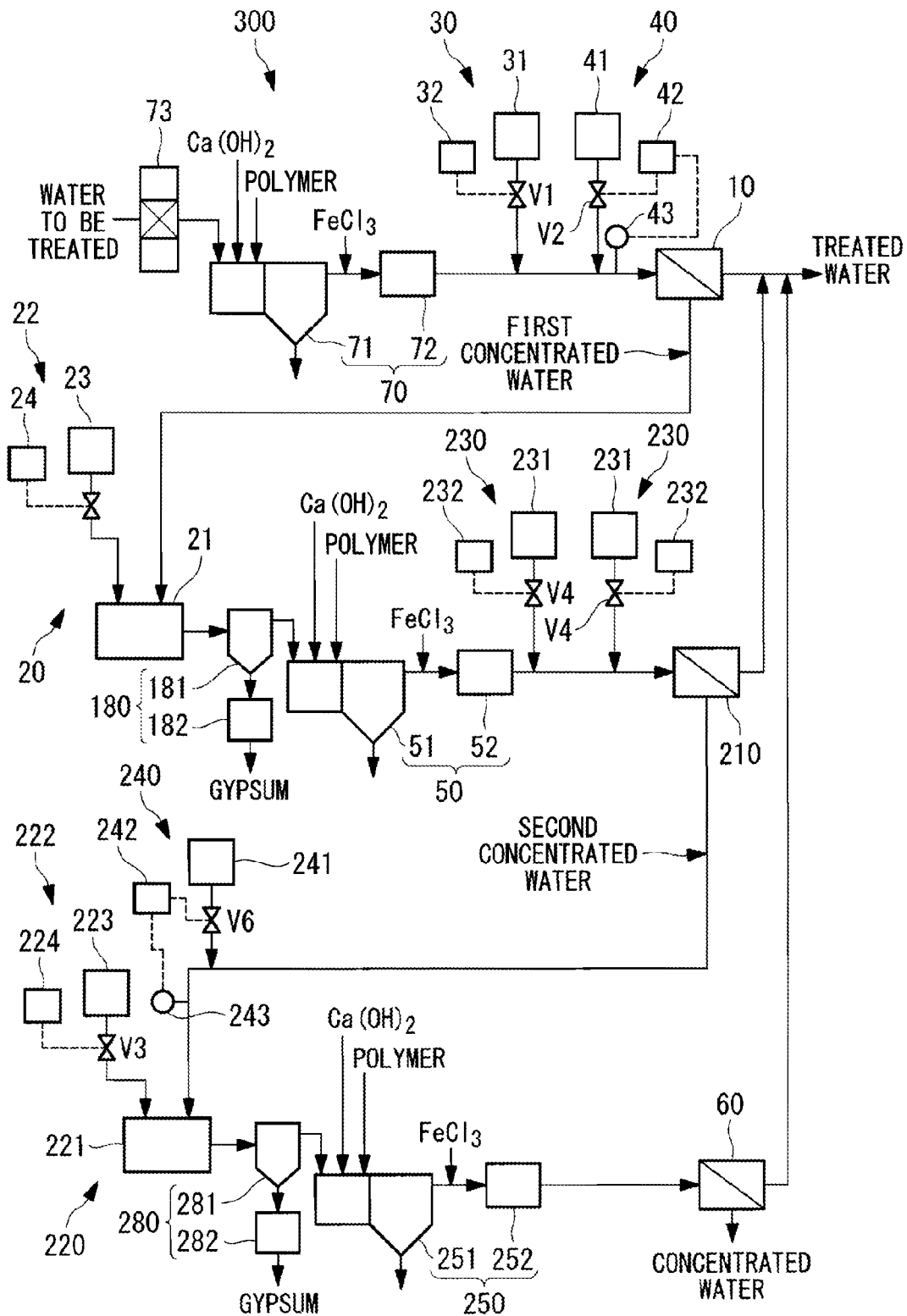
FIG. 12 is a schematic diagram of a water treatment system according to a third embodiment.

FIG. 12 is a schematic diagram of a water treatment system of the third embodiment of the present invention. In FIG. 11, the same configurations as in the first reference example, the first embodiment and the second embodiment are indicated with the same reference numerals.

In the water treatment system 300 of the third embodiment, the water treatment section described in the first reference embodiment is installed. On the downstream side of the water to be treated of this water treatment section, the water treatment section described in the second example of the second embodiment is installed.

In the water treatment system 300 of FIG. 12, a first separating section 180 is installed on the downstream side of the first crystallizing section 20. In addition, a second separating section 280, which is the same as the first separating section 180, is installed on the downstream side of the second crystallizing section 220.

A downstream side demineralizing section 60 is installed on the downstream side of the water to be treated of the second crystallizing section 220 located on the most downstream.

The water treatment system 300 of the third embodiment includes the first upstream side precipitating section 70 described in the first reference embodiment on the upstream side of the first scale inhibitor supplying section 30 and the first pH adjusting section 40 which are located on the most upstream of the water to be treated.

Further, the water treatment system 300 of the third embodiment includes a first deaerating section 73, which is the same as in the first reference embodiment, on the upstream side of the first upstream side precipitating section 70 as shown in FIG. 12. The first deaerating section 73 may also be installed on the downstream side of the water to be treated of the first upstream side precipitating section 70 and on the upstream side of the first scale inhibitor supplying section 30 and the first pH adjusting section 40.

Incidentally, a deaerating section having the same configuration as the first deaerating section 73 may be installed in the flow path between the first demineralizing section 10 and the first crystallizing section 20, in the flow path between the first crystallizing section 10 and the first precipitating section 50, in the flow path between the second crystallizing section 220 and the second precipitating section 250, and in the flow path between the first precipitating section 50 and the second demineralizing section 210.

Also in the water treatment system 300 of this embodiment, an ion-exchange equipment (not shown) and an upstream side crystallizing section (not shown) may be provided on the upstream of the first scale inhibitor supplying section 30 and the first pH adjusting section 40.

In FIG. 12, the water treatment sections from the first scale inhibitor supplying section 30 to the first precipitating section 50 and from the second scale inhibitor supplying section 230 to the second precipitating section 250 are each shown as one stage. However, it is also possible that for each section, two or more stage of water treatment sections are connected.

In the water treatment system 300 of the third embodiment, first, water to be treated is treated by the water treatment process described in the first reference embodiment and the first embodiment. First concentrated water after being treated by the process of the first reference embodiment and the first embodiment is treated as water to be treated through the steps form the second scale inhibitor supplying step to the second precipitating step described in the second example of the second embodiment.

Second concentrated water that has passed through the second precipitating section 250 on the most downstream is treated in the downstream side demineralizing section 60. The water that has passed through the downstream side demineralizing section 60 is recovered as treated water. The concentrated water in the downstream side demineralizing section 60 is discharged out of the system.

Also in this embodiment, an evaporator (not shown) may be installed on the downstream on the concentrated-water side of the downstream side demineralizing section 60.

In the third embodiment, in the case where the second concentrated water is adjusted to a pH at which the function of the calcium scale inhibitor is reduced in the second pH adjusting step, the third pH adjusting step described in the second example of the second embodiment may be performed.

Fourth Embodiment

Figure 13:
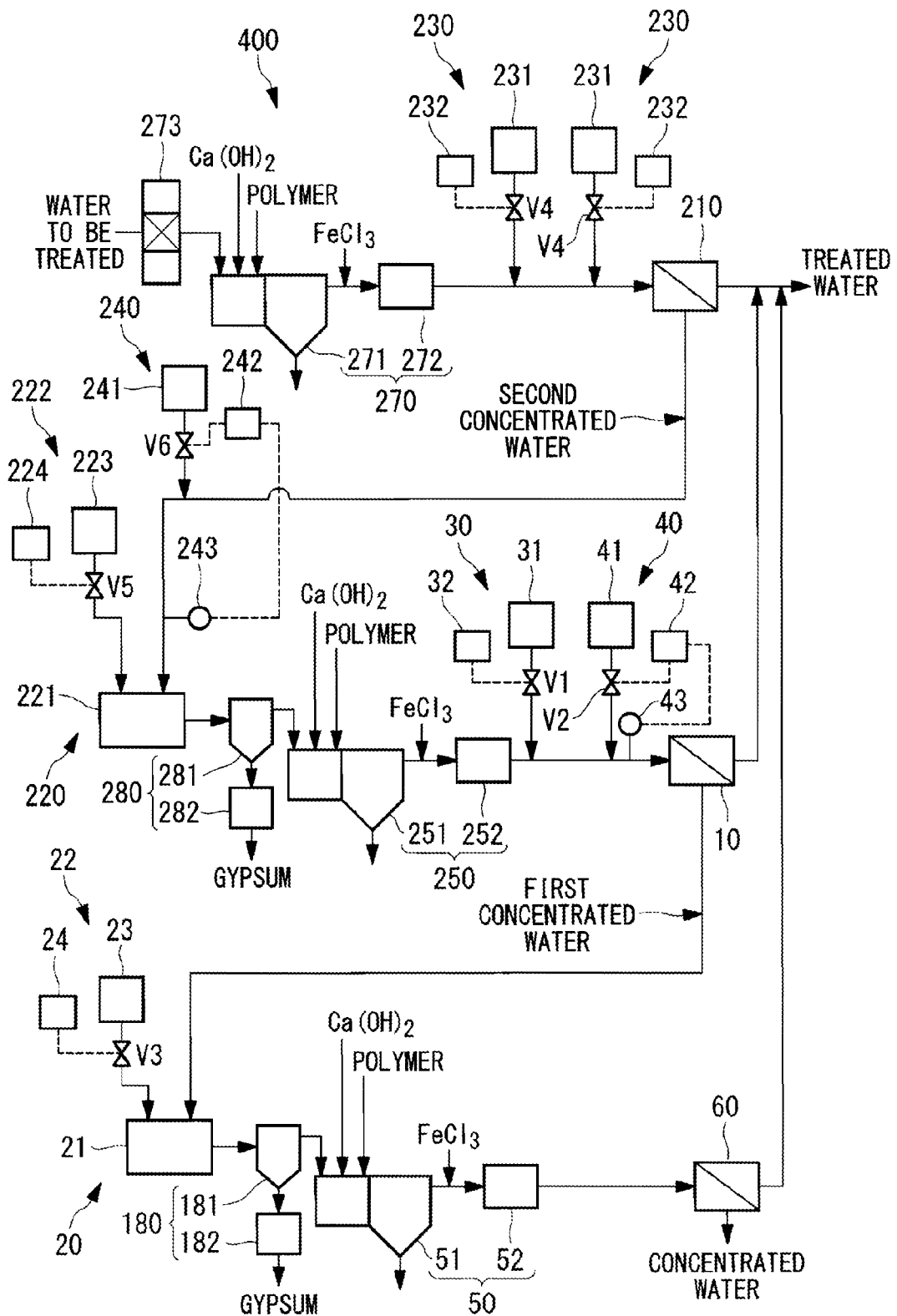
FIG. 13 is a schematic diagram explaining a water treatment system according to a forth embodiment.

FIG. 13 is a schematic diagram of a water treatment system of the fourth embodiment of the present invention. In FIG. 13, the same configurations as in the first reference embodiment, the first embodiment and the second embodiment are indicated with the same reference numerals.

In the water treatment system 400 of the fourth embodiment, the water treatment section described in the second example of the second embodiment is installed. On the downstream side of the water to be treated of this water treatment section, the water treatment section described in the first reference embodiment is installed.

In the water treatment system 400 of FIG. 13, a first separating section 180 and a second separating section 280 are installed.

A downstream side demineralizing section 60 is installed on the downstream side of the water to be treated of the first crystallizing section 20 located on the most downstream.

The water treatment system 400 of the fourth embodiment includes the second upstream side precipitating section 270 described in the second example of the second embodiment on the upstream side of the second scale inhibitor supplying section 230 located on the most upstream of the water to be treated.

Further, the water treatment system 400 of the fourth embodiment has a second deaerating section 273, which is the same as in the second example of the second embodiment, on the upstream side of the second upstream side precipitating section 270 as shown in FIG. 13. The second deaerating section 273 may be installed on the downstream side of the water to be treated of the second upstream side precipitating section 270 and on the upstream side of the second scale inhibitor supplying section 230.

Incidentally, a deaerating section having the same configuration as the second deaerating section 273 may be installed in the flow path between the second demineralizing section 210 and the second crystallizing section 220, in the flow path between the first crystallizing section 20 and the first precipitating section 50, in the flow path between the second crystallizing section 220 and the second precipitating section 250, and in the flow path between the second precipitating section 250 and the first demineralizing section 10.

Also in the water treatment system 400 of this embodiment, an ion-exchange equipment (not shown) and an upstream side crystallizing section (not shown) may be provided on the upstream of the second scale inhibitor supplying section 230.

In the water treatment system 400 of this embodiment shown in FIG. 13, a first separating section 180 and a second separating section 280 may be installed on the downstream side of the first crystallizing tank 21 and the second crystallizing tank 221, respectively.

In FIG. 13, the water treatment sections from the second scale inhibitor supplying section 230 to the second precipitating section 250 and from the first scale inhibitor supplying section 30 to the first precipitating section 50 are each shown as one stage. However, it is also possible that for each section, two or more stage of water treatment sections are connected.

In the water treatment system 400 of the fourth embodiment, first, water to be treated is treated by the water treatment process described in the second example of the second embodiment. Second concentrated water after being treated by the process of the second example of the second embodiment is treated as water to be treated through the steps form the first scale inhibitor supplying step to the first precipitating step described in the first reference embodiment and the first embodiment.

First concentrated water that has passed through the first precipitating section 50 on the most downstream is treated in the downstream side demineralizing section 60. The water that has passed through the downstream side demineralizing section 60 is recovered as treated water. The concentrated water in the downstream side demineralizing section 60 is discharged out of the system.

Also in this embodiment, an evaporator (not shown) may be installed on the downstream on the concentrated-water side of the downstream side demineralizing section 60.

In the fourth embodiment, in the case where the second concentrated water is adjusted to a pH at which the function of the calcium scale inhibitor is reduced in the second pH adjusting step, the third pH adjusting step described in the second example of the second embodiment may be performed.

Also by the water treatment system 300 of the third embodiment and the water treatment system 400 of the fourth embodiment, water to be treated containing ions can be treated with high water recovery.

In particular, the fourth embodiment is configured such that gypsum is mainly deposited in the second crystallizing section 220 on the upstream side of the water to be treated. Accordingly, the gypsum recovery in the second crystallizing section 220 is high, and the number of moles of ions fed to the downstream side is further reduced. Further, the purity of the gypsum recovered in the second crystallizing section 220 can be increased.

Second Reference Embodiment

According to the second reference embodiment of the present invention, the amount of seed crystals of gypsum to be supplied to the first crystallizing tank 21 and the second crystallizing tank 221 in the first reference embodiment, the first embodiment to the fourth embodiments is controlled. The configuration that controls the amount of seed crystals to be supplied to the first crystallizing tank 21 will be described with reference to FIG. 14. The same configuration is also applied to the second crystallizing tank 221.

In the second reference embodiment, a first pH measuring section 543 that measures the pH of the first concentrated water in the first crystallizing tank 21 is installed. The first pH measuring section 543 may be installed in the flow path that connects the first demineralizing section 10 and the first crystallizing tank 21, or may also be directly installed in the first crystallizing tank 21. The first pH measuring section 543 is connected to the control section 24 of the seed crystal supplying section 22.

Figure 14:
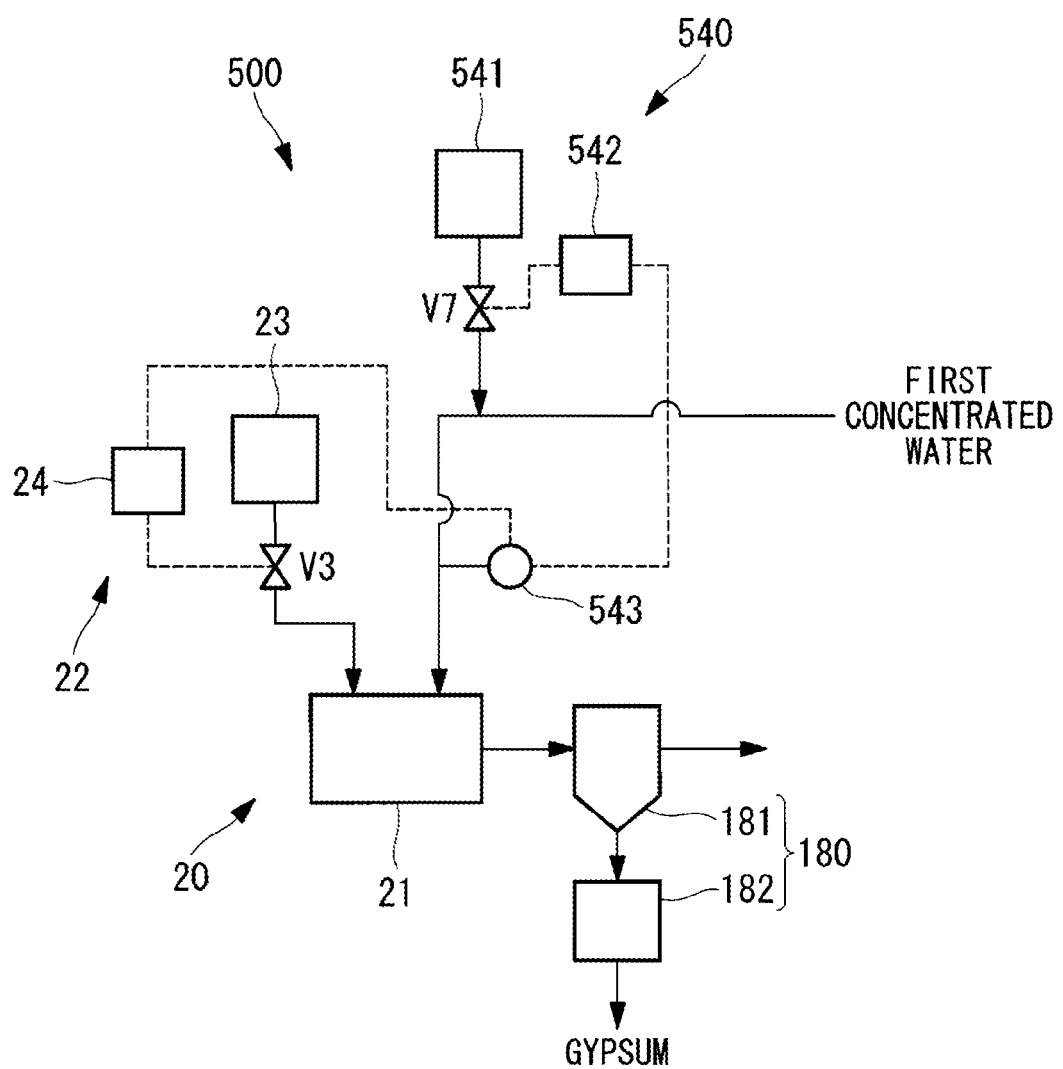
FIG. 14 is a schematic diagram explaining a water treatment system according to a second reference embodiment.

In the second reference embodiment, as shown in FIG. 14, a pH adjusting section 540 is installed. The pH adjusting section 540 includes a tank 541, a control section 542, and a valve V7. The first pH measuring section 543 is connected to the control section 542 of the pH adjusting section 540. The pH adjusting section 540 controls the pH of the first concentrated water in the first crystallizing tank 21 to a predetermined value based on the value measured by the first pH measuring section 543.

Incidentally, in the case where the amount of seed crystals of gypsum to be supplied to the second crystallizing tank 221 is controlled, the pH meter 243a described in the second example of the second reference embodiment corresponds to the second pH measuring section, and the control section 242 of the second pH adjusting section corresponds to the control section 542.

Seed crystals stored in the seed crystal tank 23 of the first seed crystal supplying section 22 may be new chemicals. However, in the case where a first separating section 180 is installed, the seed crystal tank 23 may also store gypsum separated by the classifier 181, whose particle diameter is equal to or greater than a predetermined particle diameter, or gypsum after being dehydrated by the dehydrator 182.

The control of the amount of seed crystals to be supplied in the second reference embodiment is performed through the following steps. Hereinafter, the case where the amount of seed crystals to be supplied is constantly controlled during continuous operation will be explained as an example.

The first pH measuring section 543 measures the pH of the first concentrated water in the first crystallizing tank 21. The measured pH value is sent to the control section 24 of the seed crystal supplying section 22.

The control section 24 stores the pH range where the scale inhibition function of a calcium scale inhibitor is reduced. Specifically, as described for the second crystallizing step, the pH range where the scale inhibition function of a calcium scale inhibitor is reduced is 6.0 or less, preferably 5.5 or less, and more preferably 4.0 or less.

The control section 24 compares the value measured by the first pH measuring section 543 with the above pH range. In the case where the measured value is within the above pH range, the control section 24 reduces the opening of the valve V3 to reduce the amount of seed crystals of gypsum to be supplied. In the case where the measured value is greater than the above pH range, the control section 24 increases the opening of the valve V3 to increase the amount of seed crystals of gypsum to be supplied.

Gypsum is deposited when seed crystals are present. However, in the case where the calcium scale inhibitor exerts its function, the crystallization rate is low. Accordingly, the amount of seed crystals is increased to promote crystallization. Meanwhile, in the case where the function of the calcium scale inhibitor is reduced, a sufficient crystallization rate can be obtained even when the amount of seed crystals is small.

In this way, by adjusting the amount of seed crystals to be supplied according to the pH, the amount of seed crystals used can be reduced.

In this reference embodiment, it is also possible that the pH is regularly measured during continuous operation, and seed crystals are supplied intermittently. Alternatively, it is also possible that the time-dependent variation of pH is obtained at the time of the test run of the system, for example, and the amount of seed crystals to be supplied is increased or decreased based on the obtained time-dependent variation.

Fifth Embodiment

The fifth embodiment of the present invention is a water treatment system 600 provided with at least either a first separating section 180 or a second separating section 280. The water treatment system 600 differs from the fifth reference embodiment in that gypsum separated in the separating section is directly supplied to a first crystallizing tank or a second crystallizing tank as seed crystals.

The configuration that controls the amount of seed crystals to be supplied to the first crystallizing tank 21 in this embodiment will be described with reference to FIG. 15. The same configuration is also applied to the second crystallizing tank 221.

Figure 15:
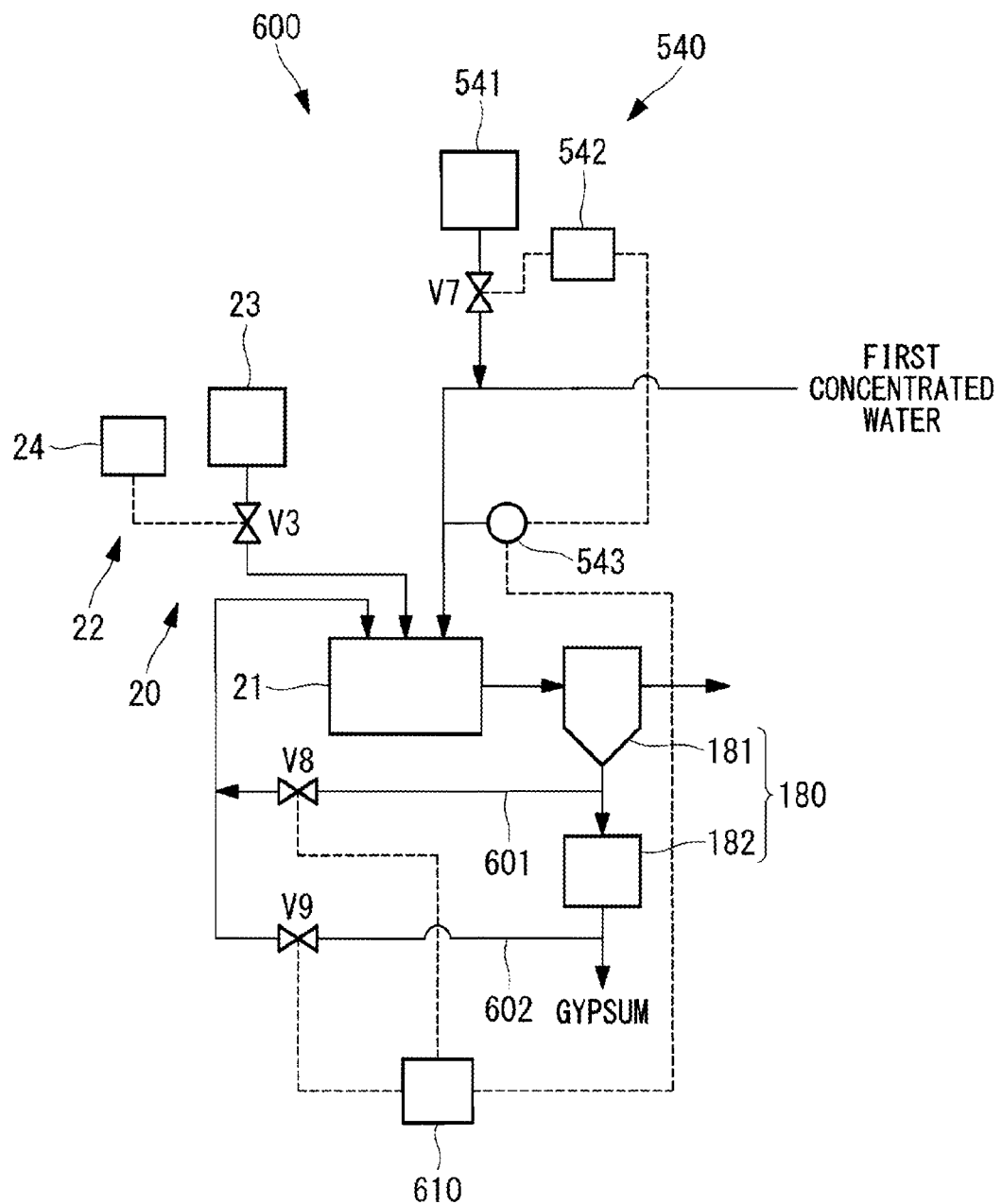
FIG. 15 is a schematic diagram explaining a water treatment system according to a fifth embodiment.

In FIG. 15, a first circulation line 601, which performs transfer so that some of the gypsum sedimented at the bottom of the classifier 181 of the first separating section 180 is supplied directly to the first crystallizing tank 21, is installed. In addition, a second circulation line 602, which performs transfer so that some of the gypsum after being dehydrated by the dehydrator 182 is supplied directly to the first crystallizing tank 21, is installed. A valve V8 is installed in the first circulation line 601, and a valve V9 is installed in the second circulation line 602. Incidentally, this embodiment may also be configured such that either the first circulation line 601 or the second circulation line 602 is installed.

The control section 610 is connected to a first pH measuring section 543, which is the same as in the second reference embodiment, the valve V8, and the valve V9.

The control of the amount of seed crystals to be supplied in the fifth embodiment is performed through the following steps. Hereinafter, the case where the amount of seed crystals to be supplied is constantly controlled during continuous operation will be explained as an example.

The first pH measuring section 543 measures the pH of the first concentrated water in the first crystallizing tank 21. The measured pH value is sent to the control section 610.

The control section 610 stores the pH range where the scale inhibition function of a calcium scale inhibitor is reduced. Through the same steps as in the second reference embodiment, the control section 610 compares the value measured by the first pH measuring section 543 with the above pH range to adjust the opening of the valve V8 and the valve V9.

In the second reference embodiment and the fifth embodiment, a seed crystal concentration measuring section (not shown) that measures the concentration of gypsum seed crystals in the first concentrated water in the first crystallizing tank 21 may be installed in the first crystallizing tank 21. The seed crystal concentration measuring section measures the concentration of seed crystals in the first crystallizing tank 21. The measured concentration value is sent to the control section 24 or the control section 610. The control section 24 or the control section 610 stores the threshold for the concentration of seed crystals, and increases the amount of seed crystals to be supplied in the case where the concentration of seed crystals is equal to or less than the threshold.

As a modification of the second reference embodiment and the fifth embodiment, a first concentration measuring section (not shown) is installed on the downstream side of the first crystallizing tank 21 and on the upstream side of the first precipitating section 50. In the case where the first separating section 180 is provided, the first concentration measuring section is preferably installed on the downstream side of the first separating section 180, but may also be installed on the upstream side of the first separating section 180. The first concentration measuring section is connected to the control section 24 or the control section 610.

In the case of the second crystallizing tank 221, a second concentration measuring section is installed in place of the first concentration measuring section.

The first concentration measuring section measures at least one of the concentration of Ca ions and the concentration of sulfate ions in the first concentrated water discharged from the first crystallizing tank 21. The measured concentration is sent to the control section 24 or the control section 610.

The concentration of Ca ions and the concentration of sulfate ions measured by the first concentration measuring section depend on the crystallization rate in the first crystallizing tank 21. In the case where the residence time is the same, lower concentrations of Ca ions and sulfate ions lead to a higher crystallization rate.

The control section 24 and the control section 610 store the threshold for at least one of the concentration of Ca ions and the concentration of sulfate ions.

In the case where at least one of the concentration of Ca ions and the concentration of sulfate ions measured by the first concentration measuring section is equal to or higher than the threshold, the control section 24 increases the opening of the valve V3 to increase the amount of seed crystals to be supplied. In the case where at least one of the concentration of Ca ions and the concentration of sulfate ions measured by the first concentration measuring section is lower than the threshold, the control section 24 reduces the opening of the valve V3 to reduce the amount of seed crystals to be supplied.

In the case where at least one of the concentration of Ca ions and the concentration of sulfate ions measured by the first concentration measuring section is equal to or higher than the threshold, the control section 610 increases the opening of the valve V8 and the valve V9 to increase the amount of seed crystals to be supplied. In the case where at least one of the concentration of Ca ions and the concentration of sulfate ions measured by the first concentration measuring section is lower than the threshold, the control section 610 reduces the opening of the valve V8 and the valve V9 to reduce the amount of seed crystals to be supplied.

Also in the case of the second crystallizing tank 221, the amount of seed crystals to be supplied is controlled through the same steps as above.

In this way, by controlling the amount of seed crystals to be supplied depending on at least one of the concentration of Ca ions and the concentration of sulfate ions after the crystallizing step, the amount of seed crystals used can be reduced.

Sixth Embodiment

Figure 16:
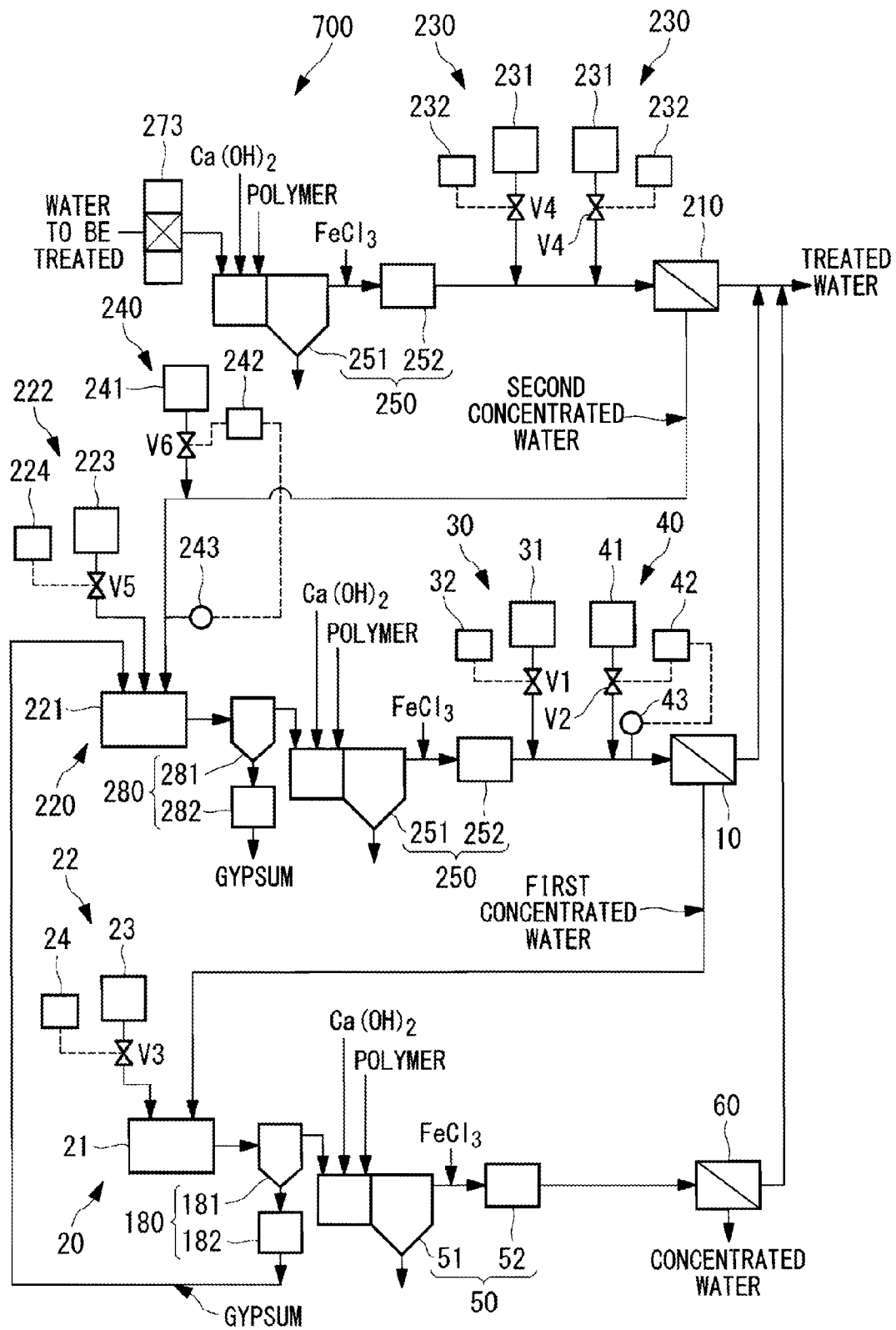
FIG. 16 is a schematic diagram explaining a water treatment system according to a sixth embodiment.

FIG. 16 is a partial schematic diagram of a water treatment system of the sixth embodiment of the present invention. In FIG. 16, the same configurations as in the first reference embodiment, the first embodiment and the second embodiment are indicated with the same reference numerals.

The water treatment system 700 of FIG. 16 is configured such that the gypsum separated from the first concentrated water in the first crystallizing section 20 in the water treatment system of the fourth reference embodiment is recovered and supplied to the second crystallizing tank 221 of the second crystallizing section 220. Also in the water treatment system of the third embodiment, the same configuration can be employed.

As described in the first reference embodiment, the pH of concentrated water (first concentrated water) in the first crystallizing tank 21 of the first crystallizing section 20 is not particularly limited. However, in terms of operation cost, it is more advantageous to perform the first crystallizing step without changing the pH from the first demineralizing step. In this case, the first crystallizing step is performed at a pH at which silica is soluble (10 or more), but the solubility of calcium carbonate is low in this pH range.

Meanwhile, as described in the second example of the second embodiment, in the second crystallizing section 220 (second crystallizing step), gypsum is crystallized in a still lower pH range. At the pH range in the second crystallizing step (6.0 or less, more preferably 4.0 or less), calcium carbonate is soluble in water. When gypsum containing calcium carbonate recovered in the first crystallizing section 20 is supplied to the second crystallizing tank 221 of the second crystallizing section 220, calcium carbonate, which is an impurity, dissolves in the second concentrated water, and gypsum is present as a solid in the second concentrated water. By using the water treatment system 300 of the sixth embodiment, water to be treated can be treated with high water recovery, and also high-purity gypsum can be recovered.

Seventh Embodiment

Figure 17:
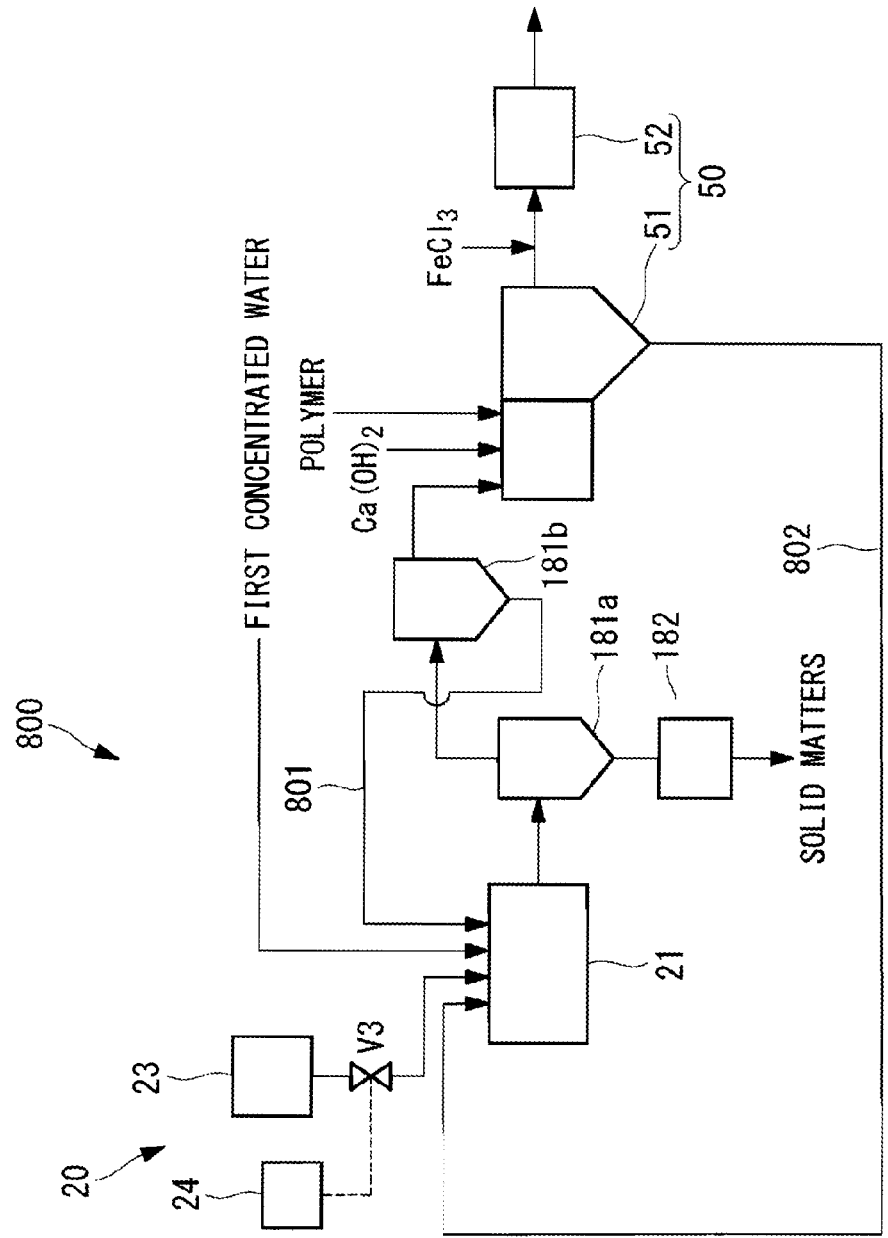
FIG. 17 is a schematic diagram explaining a water treatment system according to a seventh embodiment.

FIG. 17 is a partial schematic diagram of a water treatment system of the seventh embodiment of the present invention. In FIG. 17, the same configurations as in the first embodiment are indicated with the same reference numerals.

Incidentally, the seventh embodiment will be described hereinafter using a water treatment process including a first separating step and a water treatment system including a first separating section. However, the same configuration is also applicable to the case of a second separating step and a second separating section.

In FIG. 17, the water treatment system 800 includes, for one first crystallizing section 20, two or more classifiers (first classifiers) 181 in the flow direction of the water to be treated. In FIG. 17, two first classifiers 181a and 181b are installed. The size of gypsum to be separated is different between the first classifier 181a located on the most upstream and the first classifier 181b located on the downstream side. In this embodiment, the size of gypsum to be separated by the first classifier 181b is smaller than that of gypsum to be separated by the first classifier 181a. For example, the first classifier 181a is a classifier that separates particles having an average particle diameter of 10 μm or more, and the first classifier 181b is a classifier that separates particles having an average particle diameter of 5 μm or more.

In the case where three or more first classifiers 181 are installed, they are designed such that the size of gypsum to be separated by each first classifier 181 decreases in the direction from the upstream side toward the downstream side. The number of first classifiers installed in the flow direction of the water to be treated and the particle diameter of solid matters that can be separated by each classifier are suitably determined in consideration of the water recovery, gypsum recovery, treatment cost, etc.

In the water treatment system 800 of the seventh embodiment, the following treatment is performed in the first separating step.

In the first classifier 181a located on the most upstream, gypsum having an average particle diameter of 10 μm or more is classified and sedimented at the bottom of the first classifier 181a. The sedimented gypsum is discharged from the first classifier 181a and fed to the dehydrator 182. The supernatant in the first classifier 181a is fed to the first classifier 181b on the downstream side. This supernatant mainly contains particles having a particle diameter of less than 10 μm (gypsum, calcium carbonate, silica, etc.).

In the first classifier 181b located on the downstream side, gypsum having an average particle diameter of 5 μm or more is classified and sedimented at the bottom of the first classifier 181b. The supernatant in the first classifier 181b is fed to the first precipitating section 50.

The sedimented gypsum is discharged from the first classifier 181b. The discharged gypsum is fed to the first crystallizing tank 21 through a solid matter circulation line 801 and supplied into the first concentrated water in the first crystallizing tank 21.

The circulated gypsum functions as seed crystals in the first crystallizing tank 21, and the circulated gypsum is crystallized, followed by crystal growth. The crystal-grown circulated gypsum having an average particle diameter of 10 μm or more is fed from the first crystallizing tank 21 to the first classifier 181a together with the first concentrated water, then separated from the first concentrated water by the first classifier 181a, and transferred to the dehydrator 182.

The supernatant in the first classifier 181b contains particles having a relatively small diameter of less than 5 μm, such as those having a particle diameter of about 2 to 3 μm. In particular, in the early stage of the operation of the water treatment system (immediately after start-up, etc.), gypsum is discharged from the first crystallizing tank 21 before it grows to a sufficient size in the first crystallizing tank 21, and an increased amount of gypsum flows into the first precipitating tank 51. In such a case, a large amount of gypsum is contained in the precipitate in the first precipitating tank 51. Thus, in this embodiment, it is also possible that a circulation line 802 that connects the bottom of the first precipitating tank 51 to the first crystallizing tank 21 is provided, and solid matters containing gypsum precipitated at the bottom of the first precipitating section 51 are circulated through the first crystallizing tank 21.

According to this embodiment, the amount of gypsum recovered in the first separating section is increased, and also the water content of the recovered gypsum can be reduced. The use of the water treatment steps and the water treatment system of this embodiment leads to the reduction of the amount of gypsum particles having a relatively small diameter flowing out to the downstream side. Accordingly, the water recovery can be improved, and also the amount of waste resulting from the water treatment can be reduced.

REFERENCE SIGNS LIST 1, 100, 200, 300, 400, 500, 600, 700, 800: Water treatment system
10: First demineralizing section
20: First crystallizing section 21: First crystallizing tank
22: First seed crystal supplying section
23, 223: Seed crystal tank
24, 32, 42, 224, 232, 242, 542, 610: Control section
30: First scale inhibitor supplying section
31, 41, 231, 241, 541: Tank
40: First pH adjusting section
43, 243: pH meter
50: First precipitating section
51: First precipitating tank
52: First filtration device
60: Downstream side demineralizing section
70: First upstream side precipitating section
71: Precipitating tank
72: Filtration device
73: First deaerating section
180: First separating section
181, 181a, 181b, 281: Classifier
182, 282: Dehydrator
210: Second demineralizing section
220: Second crystallizing section
221: Second crystallizing tank
222: Second seed crystal supplying section
230: Second scale inhibitor supplying section
240: Second pH adjusting section
250: Second precipitating section
251: Second precipitating tank
252: Second filtration device
280: Second separating section
540: pH adjusting section
543: First pH measuring section
601: First circulation line
602: Second circulation line
801, 802: Solid matter circulation line

The invention claimed is:

1. A water treatment process comprising:
a scale inhibitor supplying step of supplying a calcium scale inhibitor which is a scale inhibitor for inhibiting the deposition of a scale containing calcium to water containing $Ca^{2+}$ ions $SO_4^{2-}$ ions and carbonate ions;
a first pH adjusting step of adjusting the water to a pH which is 10 or more;
a demineralizing step of separating the water in which a pH is 10 or more into concentrated water in which the $Ca^{2+}$ ions, the $SO_4^{2-}$ ions, and the carbonate ions are concentrated and treated water after the first pH adjusting step;
a second pH adjusting step of adjusting the concentrated water to a pH which is 6 or less after the demineralizing step;
a crystallizing step of supplying seed crystals of gypsum to the concentrated water in which a pH is 6 or less containing the calcium scale inhibitor so that gypsum is crystallized from the concentrated water; and
a separating step of separating the gypsum from the concentrated water after the crystallizing step.

2. The water treatment process according to claim 1, wherein among the gypsum crystallized in the crystallizing step, gypsum having a predetermined size is recovered in the separating step.

3. The water treatment process according to claim 1, wherein the gypsum separated in the separating step is used as the seed crystals of gypsum.

4. The water treatment process according to claim 1, wherein the separating step is carried out a plurality of times in sequence along a flow direction which is associated with a single crystallizing step, wherein the size of the gypsum separated in a later separating step produces smaller gypsum particles than in the first of the plurality of separating steps, and
the gypsum separated in the later separating step is supplied into the concentrated water in the crystallizing step.

5. A water treatment system comprising:
a scale inhibitor supplying section that supplies a calcium scale inhibitor which is a scale inhibitor for inhibiting the deposition of a scale containing calcium to water containing $Ca^{2+}$ ions $SO_4^{2-}$ ions and carbonate ions;
a first pH adjusting section that supplies a pH adjuster to the water to adjust the pH of the water to 10 or more;
a demineralizing section that is positioned on a downstream side of the scale inhibitor supplying section and separates the water in which a pH is 10 or more into concentrated water in which the $Ca^{2+}$ ions, the $SO_4^{2-}$ ions and the carbonate ions are concentrated and treated water;
a second pH adjusting section that adjusts the pH of the concentrated water separated in the demineralizing section to 6 or less;
a crystallizing section which is positioned on a downstream side of the demineralizing section and which includes a crystallizing tank that crystallizes gypsum from the concentrated water in which a pH is 6 or less containing the calcium scale inhibitor and a seed crystal supplying section that supplies seed crystals of gypsum to the crystallizing tank; and
a separating section that is positioned on a downstream side of the crystallizing section and separates the gypsum from the concentrated water.

6. The water treatment system according to claim 5, wherein the separating section separates and recovers the gypsum having a predetermined size.

7. The water treatment system according to claim 5, wherein the gypsum separated in the separating section is used as the seed crystals of gypsum.

8. The water treatment system according to claim 5, wherein the separating section includes a plurality of classifiers in a flowing direction of the water associated with the crystallizing section,
wherein the size of the gypsum separated in a classifier positioned downstream from a first classifier of the plurality of classifiers is smaller than the gypsum separated in the first classifier, and
the gypsum separated in the classifier positioned downstream from the first classifier is supplied to the concentrated water in the crystallizing section.

9. A water treatment process comprising:
a first scale inhibitor supplying step of supplying a calcium scale inhibitor which is a scale inhibitor for inhibiting the deposition of a scale containing calcium to water containing $Ca^{2+}$ ions, $SO_4^{2-}$ ions, carbonate ions and silica;
a first pH adjusting step of adjusting the water to a pH of 10 or more at which the silica is soluble in the water;
a first demineralizing step of separating the water in which a pH is 10 or more into first concentrated water in which the $Ca^{2+}$ ions, the $SO_4^{2-}$ ions, the carbonate ions and the silica are concentrated and treated water after the first scale inhibitor supplying step and the first pH adjusting step;
a second pH adjusting step of adjusting the first concentrated water to a pH which is 6 or less after the first demineralizing step;

a first crystallizing step of supplying seed crystals of gypsum to the first concentrated water in which a pH is 6 or less containing the calcium scale inhibitor so that gypsum is crystallized from the first concentrated water; and a first separating step of separating the gypsum from the first concentrated water after the first crystallizing step.

10. The water treatment process according to claim 9, comprising, after the first crystallizing step:
a second scale inhibitor supplying step of supplying the calcium scale inhibitor and a silica scale inhibitor which is a scale inhibitor for inhibiting the deposition of the silica to the water;
a second demineralizing step of separating the water into second concentrated water in which the Ca ions, the $SO_4$ ions, the carbonate ions and the silica are concentrated and treated water after the second scale inhibitor supplying step; and
a second crystallizing step of supplying seed crystals of gypsum to the second concentrated water so that gypsum is crystallized from the second concentrated water.

11. The water treatment process according to claim 10, comprising a second separating step of separating the gypsum from the second concentrated water after the second crystallizing step.

12. The water treatment process according to claim 11, wherein among the gypsum crystallized in the second crystallizing step, gypsum having a predetermined size is recovered in the second separating step.

13. The water treatment process according to claim 11, wherein the gypsum separated in the second separating step is used as the seed crystals of the gypsum.

14. The water treatment process according to claim 11, wherein the second separating step is carried out a plurality of times in sequence along a flow direction which is associated with a single crystallizing step,
wherein the size of the gypsum separated in a later separating step produces smaller gypsum particles than in the first of the plurality of separating steps, and
the gypsum separated in the later separating step is supplied into the second concentrated water in the second crystallizing step.

15. The water treatment process according to claim 10, comprising a third pH adjusting step of adjusting the second concentrated water to a pH of 6 or less at which calcium carbonate is soluble,
wherein in the second crystallizing step, the gypsum separated in the first separating step is supplied into the second concentrated water after the adjustment of the pH in the third pH adjusting step.

16. The water treatment process according to claim 9, wherein among the gypsum crystallized in the first crystallizing step, gypsum having a predetermined size is recovered in the first separating step.

17. The water treatment process according to claim 9, wherein the gypsum separated in the first separating step is used as the seed crystals of the gypsum.

18. The water treatment process according to claim 9, wherein the first separating step is carried out a plurality of times in sequence along a flow direction which is associated with a single crystallizing step,
wherein the size of the gypsum separated in a later separating step produces smaller gypsum particles than in the first of the plurality of separating steps, and
the gypsum separated in the later separating step is supplied into the first concentrated water in the first crystallizing step.

19. A water treatment system comprising:
a first scale inhibitor supplying section that supplies a calcium scale inhibitor which is a scale inhibitor for inhibiting the deposition of a scale containing calcium to water containing $Ca^{2+}$ ions, $SO_4^{2-}$ ions, carbonate ions and silica;
a first pH adjusting section that supplies a pH adjuster to the water to be treated to adjust the pH of the water to a pH of 10 or more at which the silica is soluble in the water;
a first demineralizing section that is positioned on a downstream side of the first scale inhibitor supplying section and the first pH adjusting section and separates the water into first concentrated water in which the $Ca^{2+}$ ions, the $SO_4^{2-}$ ions, the carbonate ions and the silica are concentrated and treated water;
a second pH adjusting section that adjusts the pH of the first concentrated water separated in the first demineralizing section to 6 or less;
a first crystallizing section which is positioned on a downstream side of the first demineralizing section and which includes a first crystallizing tank that crystallizes gypsum from the first concentrated water in which a pH is 6 or less containing the calcium scale inhibitor and a first seed crystal supplying section that supplies seed crystals of gypsum to the first crystallizing tank; and
a first separating section that is positioned on a downstream side of the first crystallizing section and separates the gypsum from the first concentrated water.

20. The water treatment system according to claim 19, comprising, on a downstream side of the water in the first crystallizing section:
a second scale inhibitor supplying section that supplies the calcium scale inhibitor and a silica scale inhibitor which is a scale inhibitor for inhibiting the deposition of silica to the water;
a second demineralizing section that is positioned on a downstream side of the second scale inhibitor supplying section and separates the water into second concentrated water in which the $Ca^{2+}$ ions, the $SO_4^{2-}$ ions, the carbonate ions and the silica are concentrated and treated water; and
a second crystallizing section which is positioned on a downstream side of the second demineralizing section and which includes a second crystallizing tank that crystallizes gypsum from the second concentrated water and a second seed crystal supplying section that supplies seed crystals of gypsum to the second crystallizing tank.

21. The water treatment system according to claim 20, comprising a second separating section that is positioned on a downstream side of the second crystallizing section and separates the gypsum from the second concentrated water.

22. The water treatment system according to claim 21, wherein the second separating section separates and recovers the gypsum having a predetermined size.

23. The water treatment system according to claim 21, wherein the gypsum separated in the second separating section is used as the seed crystals of gypsum.

24. The water treatment system according to claim 21,
wherein the second separating section includes a plurality of classifiers in a flowing direction of the water associated with the second crystallizing section,
wherein the size of the gypsum separated in a classifier positioned downstream from a first classifier of the plurality of classifiers is smaller than the gypsum separated in the first classifier, and the gypsum separated in the classifier positioned downstream from the first classifier is supplied to the second concentrated water in the second crystallizing section.

25. The water treatment system according to claim 20, wherein the second pH adjusting section adjusts the second concentrated water to a pH of 6 or less at which calcium carbonate is soluble, and supplies the gypsum separated in the first separating section to the second crystallizing section.

26. The water treatment system according to claim 19, wherein the first separating section separates and recovers the gypsum having a predetermined size.

27. The water treatment system according to claim 19, wherein the gypsum separated in the first separating section is used as the seed crystals of gypsum.

28. The water treatment system according to claim 19, wherein the first separating section includes a plurality of classifiers in a flowing direction of the water associated with the first crystallizing section,
    wherein the size of the gypsum separated in a classifier positioned downstream from a first classifier of the plurality of classifiers is smaller than the gypsum separated in the first classifier, and
    the gypsum separated in the classifier positioned downstream from the first classifier is supplied to the first concentrated water in the first crystallizing section.

* * * * *